US009105001B2

(12) United States Patent
Hampapur et al.

(10) Patent No.: US 9,105,001 B2
(45) Date of Patent: *Aug. 11, 2015

(54) ANALYTIC SOLUTION INTEGRATION

(71) Applicant: International Business Machines Corporation, Armonk, NY (US)

(72) Inventors: Arun Hampapur, Norwalk, CT (US); Tarun Kumar, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 68 days.

This patent is subject to a terminal disclaimer.

(21) Appl. No.: 13/956,762

(22) Filed: Aug. 1, 2013

(65) Prior Publication Data

US 2014/0330745 A1 Nov. 6, 2014

Related U.S. Application Data

(63) Continuation of application No. 13/874,616, filed on May 1, 2013.

(51) Int. Cl.
*G06F 17/30* (2006.01)
*G06Q 10/06* (2012.01)

(52) U.S. Cl.
CPC ............ *G06Q 10/067* (2013.01); *H05K 999/00* (2013.01); *G06F 17/30566* (2013.01)

(58) Field of Classification Search
CPC ............... H05K 999/00; G06Q 10/067; G06F 17/30566

See application file for complete search history.

(56) References Cited

U.S. PATENT DOCUMENTS

| 7,003,512 | B1* | 2/2006 | Bedell et al. ............................. 1/1 |
| 8,443,013 | B1* | 5/2013 | Lin et al. ........................ 707/810 |
| 2003/0167265 | A1* | 9/2003 | Corynen ............................ 707/4 |
| 2004/0153430 | A1* | 8/2004 | Sayad ............................... 706/61 |
| 2004/0215599 | A1* | 10/2004 | Apps et al. .......................... 707/2 |
| 2004/0236758 | A1* | 11/2004 | Medicke et al. ............... 707/100 |
| 2007/0033060 | A1* | 2/2007 | Gopalan et al. .................... 705/1 |
| 2012/0102053 | A1* | 4/2012 | Barrett et al. ................. 707/754 |
| 2012/0284316 | A1* | 11/2012 | Klinker et al. ................ 707/822 |
| 2013/0317803 | A1* | 11/2013 | Manley et al. ................... 703/21 |
| 2014/0245305 | A1* | 8/2014 | Miles et al. .................... 718/100 |

OTHER PUBLICATIONS

U.S. Appl. No. 61/651,086, filed May 24, 2012.*

* cited by examiner

*Primary Examiner* — Jay Morrison
(74) *Attorney, Agent, or Firm* — Cantor Colburn LLP; Janice Kwon

(57) ABSTRACT

Embodiments relate analytic solution integration. According to an aspect, a method for analytic solution integration includes establishing an engine abstraction layer configured to interface with a plurality of analytic engines associated with a plurality of models. A services layer is interfaced with the engine abstraction layer to provide a communication interface to invoke the analytic engines associated with the models. A user interface is provided to the services layer. The user interface is configured to define an analytic solution as an executable sequence of one or more of the models.

5 Claims, 11 Drawing Sheets

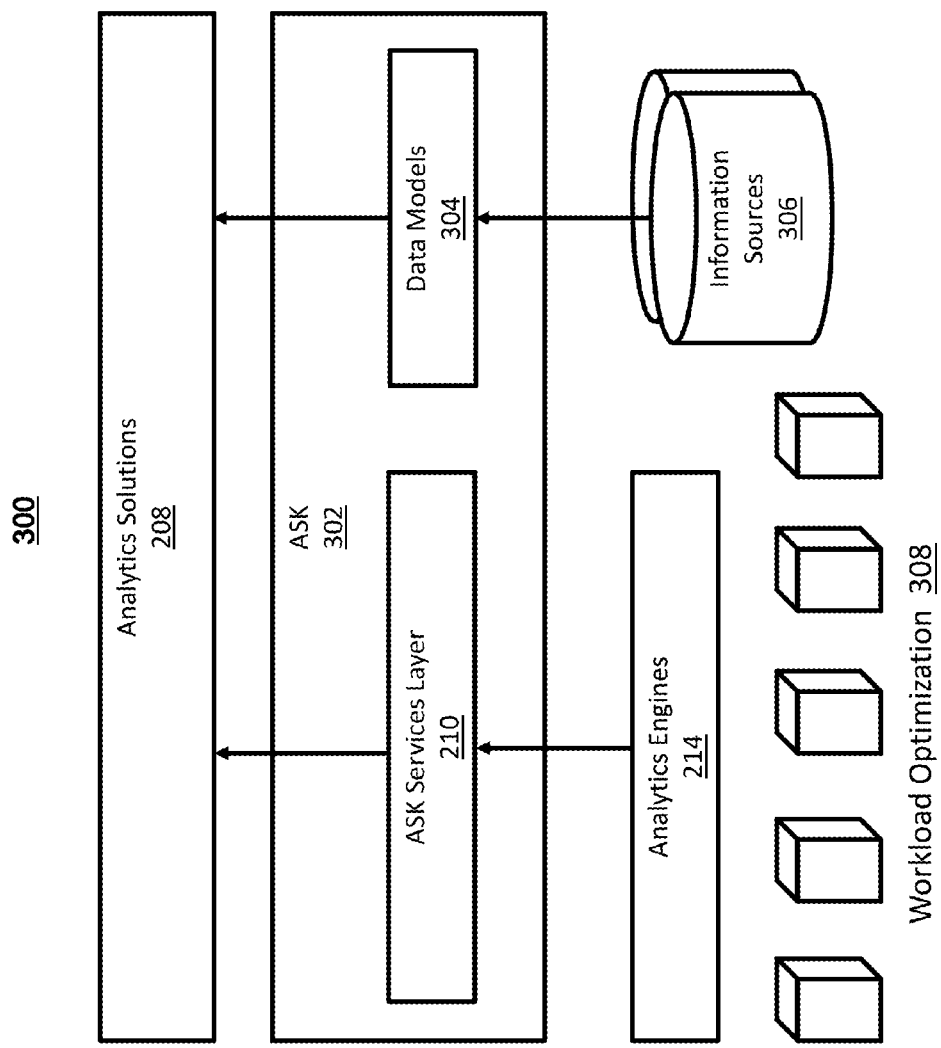

ANALYTIC SOLUTION INTEGRATION

CROSS-REFERENCE TO RELATED APPLICATIONS

This is a continuation application that claims the benefit of U.S. patent application Ser. No. 13/874,616 filed May 1, 2013, the contents of which are incorporated by reference herein in their entirety.

BACKGROUND

The present invention relates generally to computerized analytics, and more specifically, to integrating, deploying, and monitoring of analytics solutions.

In attempting to model complex systems and perform predicting, planning and budgeting for municipal development, a number of factors must be considered. In order to develop scenarios to seek optimized solutions for various constraints, such as time, location, and funding, various analytic tools can be used. Asset optimization at a city-level can also improve cost-to-performance ratios of large asset bases like water systems, grid systems, and transportation infrastructures such as rail and bus lines. To better leverage existing and planned infrastructure, planners need robust models and access to a variety of analytics.

Existing analytical tools that perform complex mathematical modeling, statistical modeling, simulation or physical modeling are typically developed and tailored towards particular industries and customers. This can create challenges when attempting to integrate multiple analytical tools and models within a common enterprise environment. Once analytic models are built, it takes considerable time and resources to integrate the models into an enterprise environment. An analytic model expert is generally not skilled in integration, while an enterprise information technology (IT) developer seldom has expertise in the application programming interface (API) to the analytical tools. This results in a skill deficiency and hence becomes a barrier-of-entry for enterprise applications seeking to leverage predictive and prescriptive capabilities within an enterprise environment.

BRIEF SUMMARY

An embodiment is a computer-implemented method for analytic solution integration. The method includes establishing an engine abstraction layer configured to interface with a plurality of analytic engines associated with a plurality of models. A services layer is interfaced with the engine abstraction layer to provide a communication interface to invoke the analytic engines associated with the models. A user interface is provided to the services layer. The user interface is configured to define an analytic solution as an executable sequence of one or more of the models.

Another embodiment is a computer program product for analytic solution integration. The computer program product includes a computer readable storage medium having computer readable program code embodied therewith, said program code being executable by a processor to perform a method. The method includes establishing an engine abstraction layer configured to interface with a plurality of analytic engines associated with a plurality of models. A services layer is interfaced with the engine abstraction layer to provide a communication interface to invoke the analytic engines associated with the models. A user interface is provided to the services layer. The user interface is configured to define an analytic solution as an executable sequence of one or more of the models.

A further embodiment is a system for analytic solution integration. The system includes a processor and an analytics solution kit executable by the processor to perform a method. The method includes establishing an engine abstraction layer configured to interface with a plurality of analytic engines associated with a plurality of models. A services layer is interfaced with the engine abstraction layer to provide a communication interface to invoke the analytic engines associated with the models. A user interface is provided to the services layer. The user interface is configured to define an analytic solution as an executable sequence of one or more of the models.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 depicts another example of an analytics solution kit environment for stakeholders to contribute to analytic solutions in accordance with an embodiment;

DETAILED DESCRIPTION

Embodiments described herein include an analytics solution kit for analytic solution integration. An analytics solution kit (ASK) is a middleware service that enriches enterprise applications with descriptive, predictive and prescriptive capabilities using analytical and optimization solutions. The deployment, execution and management of analytical and optimization models is managed seamlessly using ASK. ASK is a framework that enables management of complex mathematical programs built using a variety of tools such as optimization and modeling applications. Once models are built, ASK enables models that may otherwise be limited to a particular domain to be leveraged across multiple domains. Rather than building one-off models for each industry and customer, analytic experts can use ASK to deploy and manage a set of reusable analytical models that can be used within an industry domain. For example, to optimally route a set of crews to distant locations to fix problems with assets, mathematical programming models can be built and leveraged from a water domain to a rail domain to a power distribution domain.

In exemplary embodiments, ASK runs on top of an application server and provides an ability to define a solution, register a data schema for the solution, deploy models or analytic sequences associated with the solution, and associate those models with a particular technology. ASK is designed to support a wide variety of analytic engines. The installation and configuration of the analytic engines is contained within the ASK installation, thereby insulating the user from these issues. ASK supports analytical models from a variety of applications and custom engines, as well as deployment and execution of various reports.

To provide broad integration of analytic solutions, ASK employs a combination of abstraction layers, domain separation, and domain driven analytics. Abstraction layers can be developed as driven by common integration patterns at multiple levels in a solution stack, starting with a data ingest layer, a data management layer, an analytics engine layer and a user interaction layer. Domain separation encapsulates domain dependent data artifacts into a reference semantic model (RSM) and develops uniform methods of swapping in/out domain RSMs. Domain driven analytics leverage models developed in several ongoing engagements and integrates into them into ASK.

Figure 1:
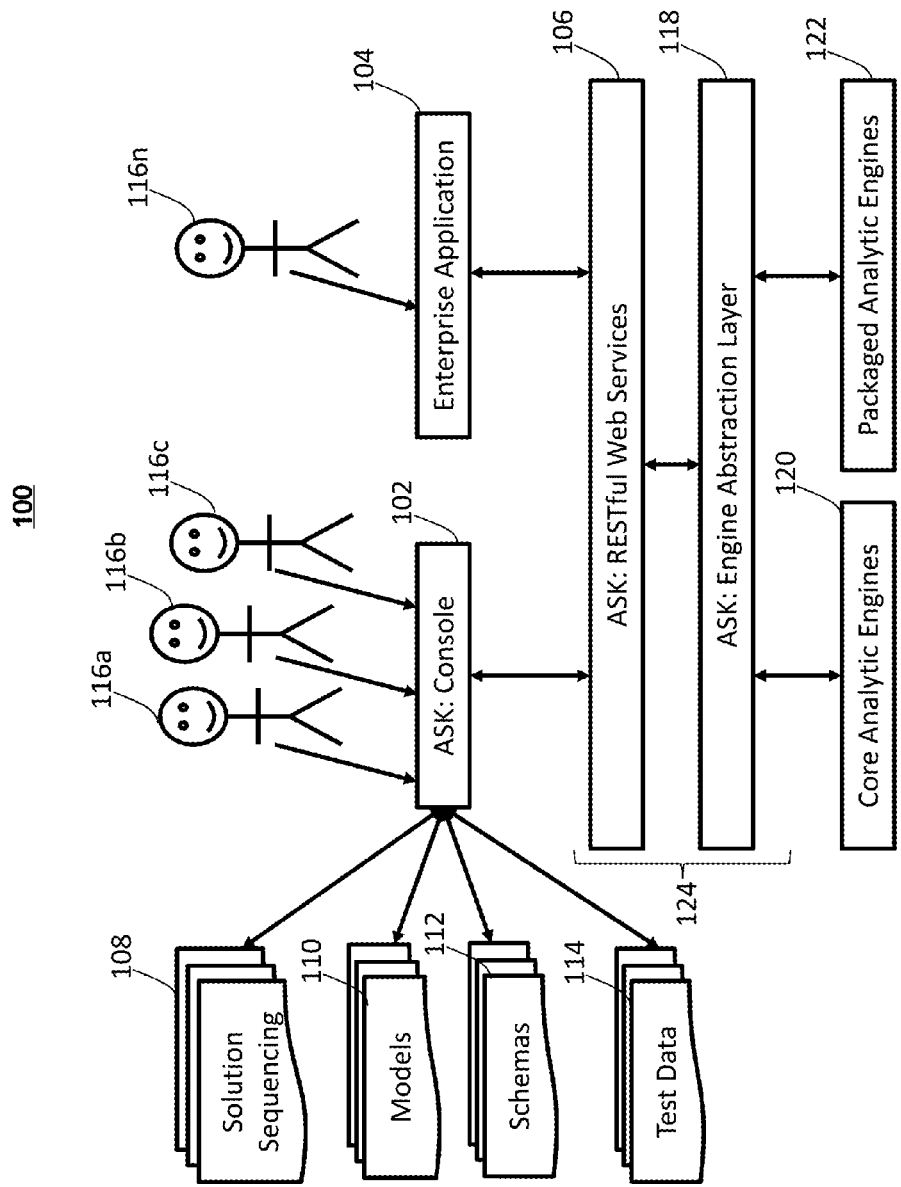
FIG. 1 depicts a functional overview of an analytics solution kit in accordance with an embodiment.

FIG. 1 depicts a functional overview 100 of an analytics solution kit in accordance with an embodiment. An ASK administrative console 102 and one or more enterprise applications 104 interface to ASK RESTful web services 106. The ASK administrative console 102 enables solution sequencing 108, models 110, schemas 112, and test data 114 to support the needs of a variety of users 116. For example, a data architect 116a, an analytics algorithm developer 116b, and an enterprise developer 116c may have roles in using the ASK administrative console 102 to access various artifacts 108-114 and initiate web service calls through the ASK RESTful web services 106. The ASK administrative console 102 may include a graphical user interface that enables users to register, deploy and execute the models 110. Similarly, an analytics solution end user 116n can use one or more enterprise applications 104 to initiate web service calls through ASK RESTful web services 106. RESTful web services use representational state transfer (REST) based communications. The ASK RESTful web services 106 interface through an ASK engine abstraction layer 118 to core analytic engines 120 and/or packaged analytic engines 122. The core analytic engines 120 can include a variety of modeling and custom engines, while the packaged analytic engines 122 can include other supported modeling engines that are part of larger packages for larger data analytics. Through the use of ASK RESTful web services 106, an enterprise application 104 can invoke the execution of a model and have the model results returned and displayed in the enterprise application 104.

Examples of types of artifacts that are supported within ASK include schemas 112, models 110, and solutions associated with the solution sequencing 108. A schema is a representation of a data model. Typical schema formats include XSD, which is an extensible markup language (XML) representation of a schema definition, and data definition language (DDL), which is a structured query language (SQL) representation. Within ASK a schema is used to describe the data that are available to an analytic model. A schema is created by a data architect, such as data architect 116a, who understands what customer data is available. The schema is installed as part of the schemas 112 in ASK so that the schema can be shared with an analytic modeler. A schema can be installed into ASK using a Schemas/Schema List/Install capability in the ASK administrative console 102, or through a registerSchema web service.

When an analytic model is installed as one of the models 110, it can be associated with a particular schema. When this linkage is established it allows for validating of input data during model execution, prior to initiating the execution. A schema is not required to be associated with a model.

A model is a representation of a descriptive, prescriptive or predictive solution to a problem. There are a variety of packaged modeling engines which ASK can support. Examples include IBM ILOG CP and CPLEX, IBM SPSS PASW Modeler, and IBM Cognos, which may be trademarks or registered trademarks of International Business Machines Corporation. The core analytic engines 120 and the packaged analytic engines 122 support building of optimization models and optimizing a range of planning and scheduling problems. The engines 120 and 122 may solve linear optimization problems, constraint programming problems, perform predictive analytics, data mining, perform business intelligence reporting, and execute a variety of mathematical models. The ASK architecture is designed to enable seamless integration of other analytic engines and also provides support for custom code engines, such as JAVA engines. The ASK engine abstraction layer 118 enables models to be installed and run within ASK without requiring specific analytic engine knowledge. The details of the engines are hidden from the ASK users.

A solution within ASK is a sequence of steps that are executed sequentially solve a problem. The steps are represented as nodes, and a node can be a model execution or a data transformation (implementation in progress). The solution can be created visually using a Solution/Analytic Solution Sequence/New capability in the ASK administrative console 102.

ASK web services can be provided using GET, POST, PUT, and DELETE operations, similar to database operations. GET retrieves information. POST creates, updates or deletes data. PUT creates or updates data. DELETE deletes data. The endpoint used for the web service is merely the end of a uniform resource identifier (URI), which begins with a uniform resource locator (URL) of an ASK instance and includes the general address of RESTful web services 106 in ASK.

Example web services include data service, validation service, execution service, configuration service, and logging service. Data service provides the ability to install, uninstall, activate, deactivate and update the schemas 112 and models 110. Solutions can be uninstalled by a data service; however, a visual editor is typically used to install solutions. Validation service provides the ability to validate the input data, input parameter and models. Execution service provides a method to execute models and sequence solutions. Configuration service defines methods to manage system properties. Logging service provides methods to retrieve logs and set a logging level. Table 1 below describes a common set of web services exposed by ASK.

TABLE 1

ASK Exposed Web Services

| Method | Description |
| --- | --- |
| Get Schemas | Retrieves the list of Schemas registered on the server |
| Get Models | Retrieves the list of models registered on the server |
| Get Analytic Engines | Retrieves the list of Engines registered on the server |
| Get Solutions | Retrieves the list of Solutions registered on the server |
| Get Sequences | Retrieves the list of Sequences registered on the server. |
| Get File | Retrieves the model/schema file specified by Id |
| Register Schema | Registers a new schema which is stored on the ASK server |
| Register Model | Registers a new Model which is stored on the ASK server |
| UnRegister Schema/Model/Solution | Deletes an existing schema/model/sequence/solution from the ASK server and deletes any models that are associated with a schema when a schema is deleted. |
| Change Status of Schema/Model | Sets a flag indicating that a particular schema/model is active/inactive |

Method Get Schemas—Retrieves a list of schemas registered on the server.
URL: http://...askws/rest/dataService/schemas{solutionId}
Method: GET
Accept: application/json
Parameters:
solutionId—Id of the Solution
Return Value Template:

```
{"schemas": {"schema": [
{
"file": "schema.xsd",
"isActive": "false",
"schemaId": "SFX_Schema_MS_01",
"schemaName": "Maintenance Scheduling",
"schemaPermission": "AllowFullPermission",
"validation": "off"
},
{
"file": "FailurePredictionSchema.xsd",
"isActive": "false",
"schemaId": "SFX_Schema_SPSS_01",
"schemaName": "SPSS Modeling Schema 1",
"schemaPermission": "AllowFullPermission",
"validation": "off"
}
]}}
```

Method Get Models—Retrieves a list of models registered on the server.
URL: http://...askws/rest/dataService/models{solutionId}
Method: GET
Accept: application/json
Parameters:
solutionId—Id of the Solution
Return value Template:

```
{"models": {"model": [
{
"analyticalEngineId": "sfx_eng_1",
"file": "ms_opl.mod",
"isActive": "true",
"modelId": "SFX_Model_MS_01",
"modelName": "Rout Scheduling",
"modelPermission": "AllowFullPermission",
"schemaId": "SFX_Schema_MS_01",
"validation": "off"
},
{
"analyticalEngineId": "sfx_eng_3",
"file": "AnomalyDetection.str",
"isActive": "true",
"modelId": "SFX_Model_SPSS_02",
"modelName": "SPSS Modeling 2",
"modelPermission": "AllowFullPermission",
"schemaId": "SFX_Schema_SPSS_01",
"validation": "off"
}
]}}
```

Method Get Analytic Engines—Retrieves a list of Analytic engines registered on the server.
URL: http://...askws/rest/dataService/engines
Method: GET
Accept: application/json
Return value Template:

```
{"analyticEngines": {"analyticEngine": [
{
"engine": "ILOG",
"engineId": "sfx_eng_1",
"subEngine": "CP",
"version": "12.2"
},
{
"engine": "SPSS",
"engineId": "sfx_eng_3",
"subEngine": "SPSS",
"version": "13"
}
]}}
```

Method Get Solutions—Retrieves a list of solutions registered on the server.
URL: http://...askws/rest/dataService/solutions
Method: GET
Accept: application/json
Return value Template:

```
{"solutions": {"solution": [
{
"solutionCreateDate": "2011-09-19T08:42:08-07:00",
"solutionDescription": "This is a very useful solution.
This is the description for the solution. It can help
organize Schemas, Models, and Sequences.",
"solutionEmail": "example@ibm.com",
"solutionId": "SFX_Solution_983",
"solutionName": "Useful Solution",
"solutionOwner": "Gus"
},
{
"solutionCreateDate": "2011-09-15T10:19:45-07:00",
"solutionDescription": "Pipe failure prediction solution
developed in China",
"solutionEmail": "example@us.ibm.com",
"solutionId": "SFX_Solution_606",
"solutionName": "MT - Pipe Failure Prediction",
"solutionOwner": "M. Taylor"
},
{
"solutionCreateDate": "2011-09-16T10:51:30-07:00",
"solutionDescription": "This is a test solution",
"solutionEmail": "example@us.ibm.com",
"solutionId": "SFX_Solution_451",
"solutionName": "Test Solution",
"solutionOwner": "M. Schulman"
},
```

```
{
"solutionCreateDate": "2011-09-22T06:14:34-07:00",
"solutionDescription": "This is a test solution",
"solutionEmail": "example@us.ibm.com",
"solutionId": "SFX_Solution_202",
"solutionName": "Test Solution",
"solutionOwner": "M. Schulman"
},
{
"solutionCreateDate": "2011-10-10T19:34:21-07:00",
"solutionDescription": "This is a workforce scheduling
solution using the analytics from the DC Water project",
"solutionEmail": "example@us.ibm.com",
"solutionId": "SFX_Solution_345",
"solutionModifiedDate" : "2011-10-10T 19:34:36-07:00",
"solutionName": "Intelligent Water MT",
"solutionOwner": "MT"
},
{
"solutionCreateDate": "2011-10-11T08:33:54-07:00",
"solutionDescription": "This is a test",
"solutionEmail": "example@us.ibm.com",
"solutionId" : "SFX_Solution_196",
"solutionName": "Intelligent Water v1",
"solutionOwner": "MT"
}
]}}
```

Method Get Sequences—Retrieves a list of sequences registered on the server.
URL: http://...askws//rest/dataService/sequences{solutionId}
Method: GET
Accept: application/json
Parameters:
solutionId—Id of the Solution
Return value Template:

```
{"sequences": {"sequence" : [
{
"author": "Gus",
"date": "2011-03-28T21:51:49-07:00" ,
"node": [
{
"id": "1",
"label": "Start",
"modelId": "--",
"modelKind": "START",
"xpos": "34",
"ypos": "101"
},
{
"id": "2",
"label": "End",
"modelId": "--",
"modelKind": "END",
"xpos": "529",
"ypos": "19"
},
{
"id": "3",
"label": "Rout Scheduling",
"modelId": "SFX_Model_MS_01",
"modelKind": "ILOG",
"xpos": "185",
"ypos": "11"
},
{
"id": "4",
"label": "Test_scheduling_model",
"modelId": "SFX_Model_283",
"modelKind": "ILOG",
"xpos": "202",
"ypos": "172"
},
{
"id": "5",
"label": "Misc",
"modelId": "--",
"modelKind": "MISC",
"xpos": "398",
"ypos": "72"
}
],
"nodelink": [
{
"from": "1",
"id": "1",
"to": "3"
},
{
"from": "1",
"id": "2",
"to": "4"
},
{
"from": "3",
"id": "3",
"to": "5"
},
{
"from": "4",
"id": "4",
"to": "5"
},
{
"from": "5",
"id": "5",
"to": "2"
}
],
"sequenceid": "SFX_Sequence_759",
"title": "Some small test"
},
{
"author": "John Doe",
"date": "2011-03-28T22:03:40-07:00",
"node": [
{
"id": "1",
"label": "Start",
"modelId": "--",
"modelKind": "START",
"xpos": "21",
"ypos": "46"
},
{
"id": "2",
"label": "End",
"modelId": "--",
"modelKind": "END",
"xpos": "252",
"ypos": "56"
},
{
"id": "3",
"label": "Pipe Prediction 2",
"modelId": "SFX_Model_413",
"modelKind": "SPSS_MODELER",
"xpos": "92",
"ypos": "117"
},
{
"id": "4",
"label": "PFP Felipe Test",
"modelId": "SFX_Model_14",
"modelKind": "SPSS_MODELER",
"xpos": "222",
"ypos": "124"
}
],
"nodelink": [
{
"from": "1",
```

```
        "id": "1",
        "to": "3"
      },
      {
        "from": "3",
        "id": "2",
        "to": "4"
      },
      {
        "from": "4",
        "id": "3",
        "to": "2"
      }
    ],
    "sequenceid": "SFX_Sequence_921",
    "title": "Marys test"
  }
]}}
```

Method Get File—Retrieves a specific schema/model file specified by schemaId/modelId, respectively.
URL: http://...askws/rest/dataService/getfile/{askType}/{id}
Method: GET
Accept: plain/text
Parameters:
askType—schema/model type
id—schema/model Id
Return value Parameters:
Return value is a plain text file.

Method Register Schema—Registers a new schema which is stored on the ASK server.
URL: http://...askws/rest/dataService/registerSchema
Method: PUT
Content-type: multipart/form-data
Accept: application/json
Parameters:
In this case, a MIME multipart message including of two parts is sent. Each part starts with a part boundary (an arbitrary string) and contains two headers—label and Content-Type—followed by the JSON/text document. The first part is the schema meta data in JSON format and the second part is the schema file in text/plain format.

```
--AskBoundary
label: schema
Content-Type: application/json
{"schema":{
"validation": "off",
"schemaPermission":"AllowFullPermission",
"file":"schema.xsd",
"schemaId":"SFX_Schema_MS_01",
"isActive":"false",
"schemaName":"Maintenance Scheduling"
}}
--AskBoundary
label: schema_file
Content-Type: text/plain
---schema file content here---
--AskBoundary
```

Return value Parameters:
The return value is a message object, which contains an array of messages and a status code, which is success/failure.

```
{"message": {
"log": [
"Schema Validation Successful",
```

```
"Schema Registration Successful",
"Datastore: Persistance successful for cc54f2c0-0b6f-467a-a48d-0a5560687368-schema.xsd"
],
"status": "success"
}}
```

Method Register Model—Registers a new model which is stored on the ASK server.
URL: http://...askws/rest/dataService/registerModel
Method: PUT
Content-type: multipart/form-data
Accept: application/json
Parameters:
In this case, a MIME multipart message is sent that includes two parts. Each part starts with a part boundary (an arbitrary string) and contains two headers—label and Content-Type—followed by the JSON/text document. The first part contains the model meta-data and the second part contains the model file.

```
--AskBoundary
label: model
Content-Type: application/json
{"model": {
"analyticalEngineId": "sfx_eng_1",
"file": "ms_opl.mod",
"isActive": "true",
"modelId": "SFX_Model_MS_01",
"modeName": "Rout Scheduling",
"modelPermission": "AllowFullPermission",
"schemaId": "SFX_Schema_MS_01",
"validation": "off"
}}
--AskBoundary
label: model_file
Content-Type: text/plain
--AskBoundary
```

Return value Parameters:
Response is a message object, which contains an array of log and a status code.

```
{"message": {
"log": [
"Model Registration: successful",
"Datastore: Persistance successful for 04505e84-3a2a-440e-9685-e8499000207d-temp.txt"
],
"status": "success"
}}
```

Method Unregister Schema/Model/Sequence/Solution—Deletes an existing schema/model/sequence/solution from the ASK server. If deleting schemas, it deletes any models that are associated with that schema.
URL: http://...askws/rest/dataService/unregister/{askType}/{stringIds}
Method: DELETE
Accept: application/json
Parameters:
askType—schema/model
stringIds—schemaId/modelId
Return value Parameters:

```
{"message": {
"log": [
```

```
"Succesfully deleted Model: SFX_Model_MS_01",
"Succesfully deleted Schema: SFX_Schema_MS_01",
"Schemas deleted successfully"
],
"messageId": "SFX_MSG_Validation",
"status": "success"
}}
```

Method Change Status of Schema/Model—Sets a flag indicating that a particular schema/model is active/inactive.
URL: http://...askws/rest/dataService/changestatus/{askType}/{statusType}/{stringIds}
Method: POST
Accept: application/json
Parameters:
askType—schema/model
statusType—active/inactive
stringIds—schemaId/modelId
Return value Parameters:

```
{"message": {
"log": "Schema status updated successfully",
"messageId": "SFX_MSG_Validation",
"status": "success"
}}
```

Table 2 below describes a set of common validation services exposed by ASK.

TABLE 2

ASK Exposed Validation Services

| Method | Description |
|---|---|
| Validate Data | Input XML data files are validated in the server against the xml schema associated with the model used. |
| Validate Sequence Data | Input XML data files are validated in the server against the xml schemas associated with the models attached to the "start" nodes of a sequence solution. |
| Validate Model | Provides the ability to validate the model |
| Validate ModelParameters | Provides the ability to validate the model parameters |
| Validate SequenceParameters | Provides the ability to validate the sequence parameters used for all models in a sequence solution |

Method Validate Data—Input XML data files are validated in the server against the xml schema associated with the model used.
URL: http://...askws/rest/validationService/data/{modelId}
Method: POST
Content-type: multipart/form-data
Accept: application/json
Parameters:
modelId—Id of the Model
The data file to be validated is attached to the request, as a MIME multipart message.
  --AskBoundary
  filename: input.xsd
  Content-Type: text/plain
  ---datafile content here---
  --AskBoundary
Return value Parameters:

```
{"message": {
"log": [
"Warning: SchemaLocation: schemaLocation
value = 'C../schema/schema.xsd'
must have even number of URI's.",
"Data Validation Successful"
],
"status": "success"
}}
```

Method Validate Sequence Data—Input XML data files are validated in the server against the xml schema associated with the model used.
URL: http://...askws/rest/validationService/sequenceData/{solutionId}
Method: POST
Content-type: multipart/form-data
Accept: application/json
Parameters:
solutionId—Id of the Solution
The data file to be validated is attached to the request, as a MIME multipart message.
  --AskBoundary
  filename: input.xsd
  Content-Type: text/plain
  ---datafile content here---
  --AskBoundary
Return value Parameters:

```
{"message": {
"log": [
"Warning: SchemaLocation: schemaLocation
value = 'C../schema/schema.xsd'
must have even number of URI's.",
"Solution Data Validation Successful"
],
"status": "success"
}}
```

Method Validate Model—Provides the ability to validate the model.
URL: http://...askws/rest/validationService/model/{modelId}
Method: POST
Content-type: multipart/form-data
Accept: application/json
Parameters:
modelId—Id of the Model
The model file to be validated is attached to the request, as a MIME multipart message.
  --AskBoundary
  filename: input.mod
  Content-Type: text/plain
  ---modelfile content here---
  --AskBoundary
Return value Parameters:

```
{"message": {
"log": "Model Validation: successful",
"status": "success"
}}
```

Method Validate Model Parameters—Provides the ability to validate the model parameters.
URL: http://...askws/rest/validationService/modelParameters/{modelId}
Method: POST
content-type: multipart/form-data
Accept: application/json
Parameters:
modelId—Id of the Model
The model file to be validated is attached to the request, as a MIME multipart message.
   --AskBoundary
   filename: input.xml
   Content-Type: text/plain
   ---parameter file content here----
   --AskBoundary
Return value Parameters:

```
{"message": {
"log": [
"Model Parameter Validation Successful",
"Data Validation Successful"
],
"status": "success"
}}
```

Method Validate Sequence Parameters—Provides the ability to validate the sequence parameters used for all models in a sequence solution.
URL: http://...askws/rest/validationService/sequenceParameters/{solutionId}
Method: POST
content-type: multipart/form-data
Accept: application/json
Parameters:
solutionId—Id of the Solution
The model file to be validated is attached to the request, as a MIME multipart message.
   --AskBoundary
   filename: input.xml
   Content-Type: text/plain
   ---parameter file content here----
   --AskBoundary
Return value Parameters:

```
{"message": {
"log": [
"Sequence Parameter Validation Successful",
"Sequence Data Validation Successful"
],
"status": "success"
}}
```

Table 3 below describes a set of common execution services exposed by ASK.

TABLE 3

| ASK Exposed Execution Services | |
|---|---|
| Service | Description |
| Execute Model with Multiple files | Executes a list of input data files, along with a parameter file used in conjunction with the engine (associated with the modelId). |
| Execute Solution with Multiple files | Executes a list of input data files for models attached to "start" nodes in sequence solution, along with a parameter file used in conjunction with all of the engines (associated with all of the modelIds in the sequence solution). |

Method Execute Model—Executes a list of input data files, along with a parameter file used in conjunction with the engine (associated with the modelId).
URL: http://...askws/rest/executeService/model/{modelId}
Method: POST
content-type: multipart/form-data
Accept: multipart/form-data
Parameters:
modelId—Id of the Model to be executed.
   --AskBoundary
   filetype: datafile
   filename: input1.xml
   Content-Type: text/plain
   ----datafile1 content here---
   --AskBoundary
   filetype: datafile
   filename: input2.xml
   Content-Type: text/plain
   ----datafile2 content here---
   --AskBoundary
   filetype: paramfile
   filename: param.xml
   Content-Type: text/plain
   ----paramfile content here---
   --AskBoundary
Return value Parameter:

```
{"message": {
"log": [
"Executing Model SFX_Model_MS_01",
"OPL Initialization complete",
"Data Transformation converted the source data to OPL format",
"Completed data transformation",
"! \-------------------------------------------------------------------------\n !
Maximization problem - 11 variables, 7 constraints\n ! TimeLimit = 5\n ! Initial
process time : 0.03s (0.00s extraction + 0.03s propagation)\n ! . Log search space :
6.3 (before), 5.2 (after)\n ! . Memory usage : 347.5 Kb (before), 437.2 Kb
(after)\n-------------------------------------------------------------------------- \n//
solution with objective -20\nalltasks = [[\n <1 0 10 10> <0 0 0 0> <0 0 0 0>]\n
[<0 0 0 0> <1 0 10 10> <0 0 0 0>]];\ntask = [<1 0 10 10> <1 0 10 10>;\nseq =
```

```
[{<\"IloIntervalVarI-24CDDEA0\" 0 0 1 0 10 10>} {\n <\"IloIntervalVarI-
24CDDDE0\" 0 1 2 0 10 10>} { }];",
"ILOG Opl exectution complete",
"Executed the model successfully"
],
"status": "success"
}}
```

Method Execute Solution—Executes a list of input data files, along with a parameter file used in conjunction with the solution engines (associated with the modelIds). The input data files are used with the models associated with the sequence solution "start" nodes. The parameter file is used for all of the models associated with the sequence solution.
URL: http://...askws/rest/executeService/model/{modelId}
Method: POST
content-type: multipart/form-data
Accept: multipart/form-data
Parameters:
solutionId—Id of the solution to be executed.
    --AskBoundary
    filetype: datafile
    filename: input1.xml
    Content-Type: text/plain
    ----datafile1 content here---
    --AskBoundary
filetype: datafile
filename: input2.xml
Content-Type: text/plain
----datafile2 content here---
    --AskBoundary
    filetype: paramfile
    filename: param.xml
    Content-Type: text/plain
    ----paramfile content here---
    --AskBoundary
Return value Parameter:

```
{"message": {
"log": [
"Executing Model SFX_Model_MS_01",
"OPL Initialization complete",
"Data Transformation converted the source data to OPL format",
"Completed data transformation",
"! ---------------------------------------------------------------------------\n !
Maximization problem - 11 variables, 7 constraints\n ! TimeLimit = 5\n ! Initial
process time : 0.03s (0.00s extraction + 0.03s propagation)\n ! . Log search space :
6.3 (before), 5.2 (after)\n ! . Memory usage : 347.5 Kb (before), 437.2 Kb
(after)\n---------------------------------------------------------------------------\n//
solution with objective -20\nalttasks = [[\n <1 0 10 10> <0 0 0 0> <0 0 0 0>]\n
[<0 0 0 0> <1 0 10 10> <0 0 0 0>]];\ntask = [< 1 0 10 10> <1 0 10 10>];\nseq =
[{<\"IloIntervalVarI-24CDDEA0\" 0 0 1 0 10 10>} {\n <\"IloIntervalVarI-
24CDDDE0\" 0 1 2 0 10 10>} { }];",
"ILOG Opl execution complete",
"Executed the model successfully"
],
"status": "success"
}}
```

Table 5 below describes a set of common configuration services exposed by ASK.

TABLE 5

ASK Exposed Configuration Services

| Service | Description |
| --- | --- |
| Set DataStoreType | Configure the server to store data on File system/Database |
| Database Parameters | Provide the server all the database parameters to establish a connection. |

Table 6 below describes a set of common logging services exposed by ASK.

TABLE 6

ASK Exposed Logging Services

| Service | Description |
| --- | --- |
| Get Log Files (Schema/Model/Execution) | Retrieves the log files in the server. The following log files are available, Schema Log/Model Log/Execution Log. |
| Set Logging Level | Provides the ability to set the Logging Level in the server. |

Method Get Log Files—Retrieves the log files in the server. The following log files may be available: Schema Log, Model Log, and Execution Log.
URL: http://...askws/rest/logService/getLog/{logType}
Method: GET
Accept: multipart/form-data Parameters:

logType—schema/model/execution

Return value Parameters:

The Return value contains MIME message with two parts. The first part contains the message meta-data and the second part contains the log file.

```
--AskBoundary
Content-Type: application/json
{"message": {
"file": "Schemafile.log",
"log": "Succesfully retrieved the Schema Log File",
"messageId": "",
"status": "success"
}}
--AskBoundary
```

Content-Type: plain/text
----Logfile content here--
--AskBoundary--
    Method Set Logging Level—Provides an ability to set the Logging Level in the server.
URL: http://...askws/rest/logService/setLog/{logLevel}
Method: GET
Accept: application/json
Parameter:
loglevel—off/fatal/error/warn/info/debug/all
Return value Parameters:

```
{"message": {
"log": [
"Succefully changed the Log Level"
],
"status": "success"
}}
```

Method Requesting an ASK REST Resource—Requests an ASK REST resource. The following brief client example is provided in Java for getting an ASK REST resource. This example uses Apache's Wink HttpClient, but there are not any implementation restrictions on how to request the resource and manipulate JSON parameter or return values.

```
public class AskClient {
public static void main(String args[ ]) {
org.apache.wink.client.ClientConfig clientConfig = new
org.apache.wink.client.ClientConfig( );
org.apache.wink.client.RestClient client = new
org.apache.wink.client.RestClient(clientConfig);
// Get Schemas
String url ="http://...askws/rest/dataService/schemas";
org.apache.wink.client.Resource resource = client.resource(url);
ClientResponse response =resource.accept("application/json").get( );
System.out.println("The response code is: " + response.getStatusCode( ));
System.out.println("The response message body is: " + response.getEntity(String.class));
// Register Schema
Schema s = new Schema( );
s.setSchemaId("SFX_Schema_MS_Murali");
s.setSchemaName("Murali schema");
s. setActive(false);
s. setFile("Murali_file. xsd");
s. setSchemaPermission("AllowFullPermission");
s.setValidation("off");
File f = new File("C:/ASK/SFX_DataSchema/schema1.xsd");
OutPart op1 = new OutPart( );
op1.setContentType(MediaType. APPLICATION_JSON);
op1.setBody(s);
OutPart op2 = new OutPart( );
op2.setContentType("text/plain");
op2.setBody(f);
List<OutPart>list = new ArrayList<OutPart>( );
list.add(op1);
list.add(op2);
OutMulti outMulti = new OutMulti( );
outMulti.setBoundary("schemaBoundary");
outMulti.setOutPart(list);
String url = "http://...askws/rest/dataService/registerSchema";
org.apache.wink.client.Resource resource = client.resource(url);
ClientResponse response = resource.contentType("multipart/form-
data;boundary=schemaBoundary").accept("application/json").post(outMulti);
System.out.println("The response code is: " + response.getStatusCode( ));
System.out.println("The response message body is: " + response.getEntity(String.class));
}
```

In exemplary embodiments, the combination of the ASK RESTful web services 106 and the ASK engine abstraction layer 118 is referred to as an ASK engine 124. The ASK engine 124 may support registration of XML input schemas (XSD) and registration of analytic model files (e.g., ILOG .mod files, SPSS .str files, Cognos .zip files, Custom Engine Model .jar files, and the like), which includes associating the models 110 with schemas 112, and analytical engines 120 or 122 (e.g., ILOG CP/CPLEX, SPSS). The ASK engine 124 can also perform validation of XML input data files against an XSD, and execution of the models 110, which includes providing the model results back to a client, such as the ASK console 102 or enterprise application 104. The ASK engine 124 also supports logging of all engine component executions.

In one example, a class FrameworkHandler is used to invoke functionality of the ASK engine 124 as follows:

public interface IFrameworkHandler {

/**

* generates an execution ID for use as message ID for Message Objects for execution state filtering

* @return unique id

*/ public String generateExecutionId();

/**

* registers a PropertyChangeListener for execution state changes

* @param l

*/ public void registerStateListener(PropertyChangeListener l);

/**

* removes a PropertyChangeListener for execution state changes

* @param l

*/ public void removeStateListener(PropertyChangeListener l);

/**

* Returns all client Schema objects for use with clients

* @param solution Id

* @return list of Schema objects

*/ public ArrayList<Schema> getSchemas(String solutionId);

/**

* Returns all client Model objects for use with clients

* @param solution Id

* @return list of Model objects

*/ public ArrayList<Model> getModels(String solutionId);

/**

* Returns all client Sequence objects for use with clients

* @param solution Id

* @return list of Solution objects

*/ public ArrayList<Sequence> getSequences(String solutionId);

/**

* Returns all client Solution objects for use with clients

* @return list of Solution objects

*/ public ArrayList<Solution> getSolutions();

/**

* Returns all analytic engine objects for use with clients (including diagnostic model info).

* @return list of AnalyticEngine objects

*/ public ArrayList<AnalyticEngine> getAllAnalyticalEngines();

/**

* Returns all analytic engine objects for use with clients

* @return list of AnalyticEngine objects

*/ public ArrayList<AnalyticEngine> getAnalyticalEngines();

/**

*

* Helper function returns the AnalyticEngine object mapped to a specific model object via model ID.

* If no model object is found or if no engine object is found, null is returned.

* @param modelId ID used for referencing Model objects

* @return AnaltyicEngine object

*/

```
public AnalyticEngine getModelEngine(String modelId);

/**
* Used by clients to register client Solution objects in DataStore objects.
* @param s Solution object
* @return Message object
*/
public Message registerSolution(Solution s);

/**
* Used by clients to register client Schema objects in DataStore objects.
* @param s Schema object
* @return Message object
*/
public Message registerSchema(Schema s);

/**
* Used by clients to register client Model objects in DataStore objects.
* @param m Model object
* @return Message object
*/
public Message registerModel(Model m);
```

/**

* Used by clients to register Sequence objects in DataStore objects.

* @param s SequenceSolution Object

* @return Message object

*/ public Message registerSequence(Sequence s);

/**

* Validates if the data store used by the engine is valid or not.

* For the XML-based file data store, the XML file is validated against the XML schema.

* @return true or false

*/ public boolean validateDataStore();

/**

* Returns model information based on the model referenced in the data store by the

* associated engine. The information can be input/output info,etc.

* @param modelId

* @return Message object

*/ public Message getModelInfo(String modelId);

/**

* Executes the diagnostic model attached to the supplied engine.

* @param engineId

* @return

*/ public boolean executeDiagnosticModel(String engineId);

/**

* Legacy version of model execution is done here.

* Given a model ID and input data file, the data store is used to

* locate/run the model based on an associated engine.

* @param modelId ID associated with registered model object in data store

* @param dataFile list of input files

* @return Message object

*/ public Message executeModel(String modelId, File dataFile);

/**

* Standard version of model execution is done here.

* Given a model ID, list of input files, and a param file, the data store is used to

* locate/run the model based on an associated engine.

* @param modelId ID associated with registered model object in data store

* @param dataFiles list of input files

* @param paramFile parameter configuration XML file

* @return Message object

*/ public Message executeModel(String modelId, ArrayList<File> dataFiles, File paramFile);

/**

* Execution of dynamic model is done here.

* Given a model file, list of input files, and a param file,

* the model file is loaded/run based on an associated engine.

* @param modelFile model file to run against associated engine

* @param dataFiles list of input files

* @param paramFile parameter configuration XML file

* @return Message object

*/ public Message executeModel(File modelFile, String engineId, ArrayList<File> dataFiles, File paramFile);

```
/**
* Execution of sequence is done here.
* Given a solution ID, list of input files, and a param file,
* the data store is used to locate/run the sequence and all of its models.
* @param solutionId
* @param dataFiles
* @param paramFile
* @return
*/
public Message executeSequence(String solutionId, ArrayList<File> dataFiles, File paramFile);

/**
* Validation of model data file based on registered engine via engine ID.
* @param analyticalEngineId ID associated with analytical engine registered in data store
* @param dataFile model file to validate against.
* @return Message object
*/
public Message validateModel(String analyticalEngineId, File dataFile);
```

```
/**
* Validation of model input data against model.
* If XML input data, then XML schema associated with model is used for validation.
* @param modelId
* @param dataFile
* @return Message object
*/
public Message validateData(String modelId,File dataFile);

/**
* Validation of model input data against models associated with start nodes in sequences.
* @param solutionId
* @param dataFile
* @return Message object
*/
public Message validateSequenceData(String solutionId,File dataFile);

/**
* Validation of parameter configuration XML file used in associated model.
* @param modelId
```

* @param paramFile

* @return Message object

*/ public Message validateModelParameters(String modelId, File paramFile);

/**

* Validation of parameter configuration XML file used in associated sequences.

* @param solutionId

* @param paramFile

* @return Message object

*/ public Message validateSequenceParameters(String solutionId, File paramFile);

/**

* Unregisters sequences, models, and schemas from data store.

* @param id

* @param askType

* @return Message object

*/ public Message unregister(List<String> id,TypeEnum askType);

/**

* Changes status (active/inactive) of Models and Schemas registered in data store.

* @param id

* @param askType

* @param askStatus

* @return

*/ public Message changeStatus(List<String>id,TypeEnum askType,StatusEnum askStatus);

/**

* Used by clients to retrieve a log file associated with logFileType.

* Logs can be Model, Schema, Solution, and Execution.

* @param logFileType

* @return Message object containing log file

*/ public Message getLog(LogFileTypeEnum logFileType);

/**

* Sets the log level for logging in the LogHandler object.

* @param logLevel

* @return Message object

*/ public Message setLogLevel(LogLevel logLevel);

/**

* Gets the current log level used for logging in the LogHandler object.

* @return

*/ public String getLogLevel();

/**

* Sets the current Data Store type to use - currently either File Data Store or

* Database Data Store (DB2).

* @param dataStoreType

* @return Message object

*/ public Message setDatastoreType(DataStoreTypeEnum dataStoreType);

/**

* Used to configure the database used for the database data store.

* @param driver

* @param url

* @param userName

* @param password

* @return Message object

*/ public Message configureDatabase(String driver, String url, String userName, String password);

/**

* Used to return all execution run states found in State Store.

* @return ArrayList object of runs

*/ public ArrayList<RunInfo> getRuns();

/**

* Used to return all execution run states found in State Store filtered by executionId.

* @param executionId

* @return ArrayList object of runs

*/ public ArrayList<RunInfo> getRuns(String executionId);

/**

* Used to return all execution run states found in State Store filtered by cutoffs start and/or end dates and

* optional executionId.

* @param start date

* @param end date

* @param executionId

* @return ArrayList object of runs

*/ public ArrayList<RunInfo> getRuns(Date startDate, Date endDate, String executionId);

/**

* Used to return the specific run state found in State Store filtered by runId.

* @param executionId

* @return RunInfo object

*/ public RunInfo getRun(String runId);

/**

* Used to delete run state info in the State Store, based on a list of run Ids

* @param runIdList

* @param msg

*/ public void deleteRuns(List<String> runIdList, Message msg);

}

A FrameworkHandler Message object for the ASK engine 124 may contain the following:

```
/** message Id is used to identify execution using this Message object */
private String messageId;
/** sequence id used to identify if message is from a sequence */
private String sequenceId;
/** status enum to return based on results */
public static enum Status {success,fail,warn};
/** status value itself to return based on results of run */
private Status status;
/** list of log info from a run */
private List<String>log = new ArrayList<String>( );
/** legacy use of old storage of one file only for return - kept in case needed */
private File file;
/** use of list of result files */
private List<File>files = new ArrayList<File>( );
along with get/set functionality.
```

Success/Fail results, and message logging are part of a message object that is sent/received from the FrameworkHandler. An analyticEngine package may be used to provide execution, validation, and configuration to the analytic engines 120 and 122. A class, AnalyticEngineFactory, of the analyticEngine package of the ASK engine 124 may be provided according to the following example:

```
private AnalyticEngineFactory( )
public static AnalyticEngineFactory getAnalyticEngineFactory( )
public AnalyticEngine createAnalyticEngine(String engine, String subengine, String
    version) throws Exception.
```

AnalyticEngineFactory( ) is a default constructor. getAnalyticEngineFactory( ) returns the current instance of the factory object. CreateAnalyticEngine uses engine class information (stored in a data store for analytic engine 120/122) to invoke the correct analytic engine code. The frameworkHandler's getModelInfo( ) function is used to return XML containing the input/output of a model file. This may be performed for SPSS models, which can potentially be used for building model parameter files. In ILOG models, it generates XML containing data types of a model file.

The ASK engine 124 may support several types of registration. Registration of a data schema into the schemas 112 can be performed through the ASK console 102 or web services. Registration of an analytical model in the models 110 can also be performed through the ASK console 102 or web services. Registration of a solution for solution sequencing 108 may be performed by the ASK console 102 via a diagram editor. When a schema or model is registered, the ASK engine 124 copies user files to an ASK server. If a file system is being used to store artifacts, the name of the data store may be FileDataStore, and the files are copied to an /ASK directory. The model file can be copied into an /ASK/SFX_Model directory and the schema file can be copied into an /ASK/SFX_DataSchema directory. When the files are copied over, the file names may be prefixed with a Universally Unique Identifier (UUID). If a database is used to store artifacts, then the file can be inserted into an artifact table in the database.

Updating the models 110 and schemas 112 may follow the same process as registering new ones (e.g., invoking FrameworkHandler's registerModel( ) or registerSchema( )). Whenever a model or schema is registered, its model Id and schema Id can be checked to see if they already exist. If they do, the existing associated files are removed, and the data store is updated to use the latest information instead (i.e., filename, etc.). When a sequence is registered as part of solution sequencing 108, the ASK engine 124 may store sequences in the data store with appropriate node and link information as needed.

Validation may be invoked through the ASK engine 124 in a number of ways, such as through the ASK console 102, models 110, schemas 112, or web services. Input XML data files can be validated in the ASK engine 124 against an XML schema associated with the model used. For sequencing solutions, XML data files can be validated against models associated with start nodes. The FrameworkHandler may include a function: public Message validateData(String modelId, File dataFile), which may invoke a DataValidator class, which invokes a validate method to validate an input file against a schema associated with a model based on a modelID. Similarly, a validateSolutionData function may be used to invoke a SolutionDataValidatorClass for validation.

For models that have a proprietary file input format, validation support is based on the results of execution/validation of the underlying analytical engine 120/122 itself. Proprietary input data are not validated by the DataValidator class in this case and are passed directly into the analytic engine component 120/122 during execution. Model Parameter file validation and solution Parameter file validation invoke a ModelParamValidator class and a validatorSolutionParamValidator class respectively.

Model validation during model registration (if supported by the analytic engine 120/122) is provided by the ModelValidator class. It may be invoked by the modelRegister( ) function in the FrameworkHandler. The ModelValidator function, public boolean validate(Message msg, Model m), creates an analytic engine object based on the engine class, and invokes validateModel( ) on the engine object to do validation (if any). Throughout validation, message objects are sent/received from the FrameworkHandler with success/fail results and message logging.

Sequence Validation during sequence registration is provided by the SequenceValidator class. It is invoked by the sequenceRegister( ) function in FrameworkHandler. The SequenceValidator function, public boolean validate(Message msg, Sequence s), creates an XML stream and validates the stream against the data store schema.

The ASK engine 124 executes models 110 that are registered. Input XML data files are validated in the ASK engine 124 by the XML schema associated with the model used. The FrameworkHandler may include two execute functions: "public Message executeModel(String modelId, ArrayList<File> dataFiles, File paramFile)". The first function executes a single input data file with no parameters. The second function executes a list of input data files, along with a parameter file used in conjunction with the engine (associated with the modelId). Both functions create an analytical engine object and invoke the following functions on the analytical engine object: public abstract boolean execute(Message msg, Model model, ArrayList<File> dataFiles, File paramFile); public abstract boolean execute(Message msg, Model model, File dataFile). The ASK engine 124 executes models 110 associated with an XML schema, analytical engine, and an input XML file. For analytic engines 120/122, such as ILOG, native ILOG .dat files can be used instead of general input XML files. During execution, message objects are sent/received from the FrameworkHandler with success/fail results and message logging.

The ASK engine 124 executes registered sequencing solutions. The FrameworkHandler may include function: public Message executeSolution(String solutionId, ArrayList<File> dataFiles, File paramFile). This function executes the sequence solution found in the data store, passing in input data files to the models 110 attached to "start" nodes. The parameter file is applied to all models in the entire sequencing solution. All models 110 attached to "end" objects have their outputs attached to the returning Message object. All sibling nodes are executed simultaneously. The Message object log contains log information from all executed nodes.

format. Other analytic engines 120/122 may provide their own mappings/result files, such as SPSS.

In an ASK util package, a LogHandler is used to log server-side engine messages whenever FrameworkHandler functionality is accessed. It may use a log 4j package for logging, with a properties file for configuration. The following log files may be available for use and in an \ASK\SFX_Logs directory.

SchemaLog—Log showing all XML Schema activity (install/remove/validate).
ModelLog—Log showing all model activity (install/remove/validate/execute).
SequenceLog—Log showing all sequence-based activity (install/remove/validate/execute).
SolutionLog—Log showing all solution-based activity(install/remove).
ExecutionLog—Log showing all general activity (Data Store, Analytic Engine).

Similar to the FileDataStore in package dataStore, there is a FileStateStore in package stateStore used to store run execution information. The run information can be stored in an XML file, ASF_State_Store.asf, in an \ASK directory. Each analytic engine 120/122 may create a RunInfo class containing the following fields along with get/set functionality to support them:

```
/** ID used for filtering StateInfo objects on listeners */
private String executionId; // id used by client to identify object for listeners
/** sequence ID associated with run - if part of sequence */
private String sequenceId; // can be null if standalone runs
/** model ID of model being executed */
private String modelId;
/** date and time of start of run */
private Date runDate;
/** date and time of end of run */
private Date endDate;
/** result of execution state - set if execution ended */
private boolean resultState;
/** ID used to distinguish specific model execution - used as prefix for output files */
private String runId; // same as UUID for run - used for output prefix
/** ID available in case used in future */
private String userId; // future use
private List<File>inputFiles = new ArrayList<File>( );
private List<File>outputFiles = new ArrayList<File>( );
private File paramFile;
private List<StateInfo>states = new ArrayList<StateInfo>( );
```

When the ASK engine 124 finishes execution successfully, result solution information is logged to the Message object, along with an attached output file listing the input/solution data. For an ILOG engine, an XML file is returned. Other types of output files may be supported dependent on the analytic engine 120/122 (e.g., SPSS can return .csv files, etc., Cognos can return pdf). Result solution File objects are returned when execution completes successfully. If errors occur, the Message object is updated with status messages and success/fail results, with logging.

In one example, the XML result solution file has the header/trailer of:

```
<?xml version="1.0" encoding="UTF-8"?><Solution>
<!--Ilog-based Solution-->
...
...
</Solution>
```

The handling of result solution output, automatic vs. required mapping, is analytic engine dependent. For example, an ILOG engine may require mapping for output to XML. For a class IlogOplEngine, a function "protected void generateOutput(Message msg)" maps a native solution to an XML Each RunInfo object contains a list of StateInfo objects that are used so far with the run:

```
/** Run states for an execution */
public static enum RunStateEnum {ReadyTo Start, Executing, Ended};
/** date and time of state received - filled in by listener */
private Date createDate;
/** execution state */
private RunStateEnum state;
private List<String>log = new ArrayList<String>( );
```

The states used for a run are: ReadyToStart, Executing, and Ended. During execution, the following example code updates run execution fields and logs the information. These invocations are done in the ASK engine 124. The following example is used to set ReadyToStart state, given an runInfo instance of object RunInfo:

```
runInfo.setExecutionId(msg.getMessageId( ));
runInfo.setSequenceId(msg.getSequenceId( ));
runInfo.setModelId(model.getModelId( ));
runInfo.setRunDate(new Date( ));
runInfo.setInputFiles(dataFiles);
```

-continued

```
runInfo.setParamFile(paramFile);
runInfo.setState(StateInfo.RunStateEnum.ReadyToStart);
runInfo.setRunId(uuid.toString( ));
StateHandler.getState( ).logState(runInfo);
// send run state info to ASK Logging
LogHandler.getExecutionLogger( ).info("State: " + runInfo);
```

The following example is used to set Executing state:

```
runInfo.setState(StateInfo.RunStateEnum.Executing);
StateHandler.getState( ).logState(runInfo);
// send run state info to ASK Logging
LogHandler.getExecutionLogger( ).info("State: " + runInfo);
```

The following example is used to set Ended state:

```
runInfo.setState(StateInfo.RunStateEnum.Ended, msg.getLog( ));
runInfo.setResultState(isValid);
runInfo.setEndDate(new Date( ));
StateHandler.getState( ).logState(runInfo);
// send run state info to ASK Logging
LogHandler.getExecutionLogger( ).info("State: " + runInfo);
```

Where a RunInfo object is sent the StateHandler's singleton instance to log the state, it may be published by the PropertyChangeSupport object in StateHandler. The FileStateStore is registered to receive StateHandler PropertyChangeSupport runInfo updates. The FileStateStore's propertyChange method is invoked to update/create XML information for the runInfo object.

In a package, handler, the FrameworkHandler may contain the following functionality to access the run information and delete the runs:

```
/**
* Used to return all execution run states found in State Store.
* @return ArrayList object of runs
*/
public ArrayList<RunInfo> getRuns( );
/**
* Used to return all execution run states found in State Store filtered by executionId.
* @param executionId
* @return ArrayList object of runs
*/
public ArrayList<RunInfo> getRuns(String executionId);
/**
* Used to return all execution run states found in State Store filtered by cutoffs start
and/or end dates and
* optional executionId.
* @param start date
* @param end date
* @param executionId
* @return ArrayList object of runs
*/
public ArrayList<RunInfo> getRuns(Date startDate, Date endDate, String executionId);
/**
* Used to return the specific run state found in State Store filtered by runId.
* @param executionId
* @return RunInfo object
*/
public RunInfo getRun(String runId);
/**
* Used to delete run state info in the State Store, based on a list of run Ids
* @param runIdList
* @param msg
*/
public void deleteRuns(List<String> runIdList, Message msg);
```

This code can be accessed by the ASK console 102 to display/prune run information.

Figure 2:
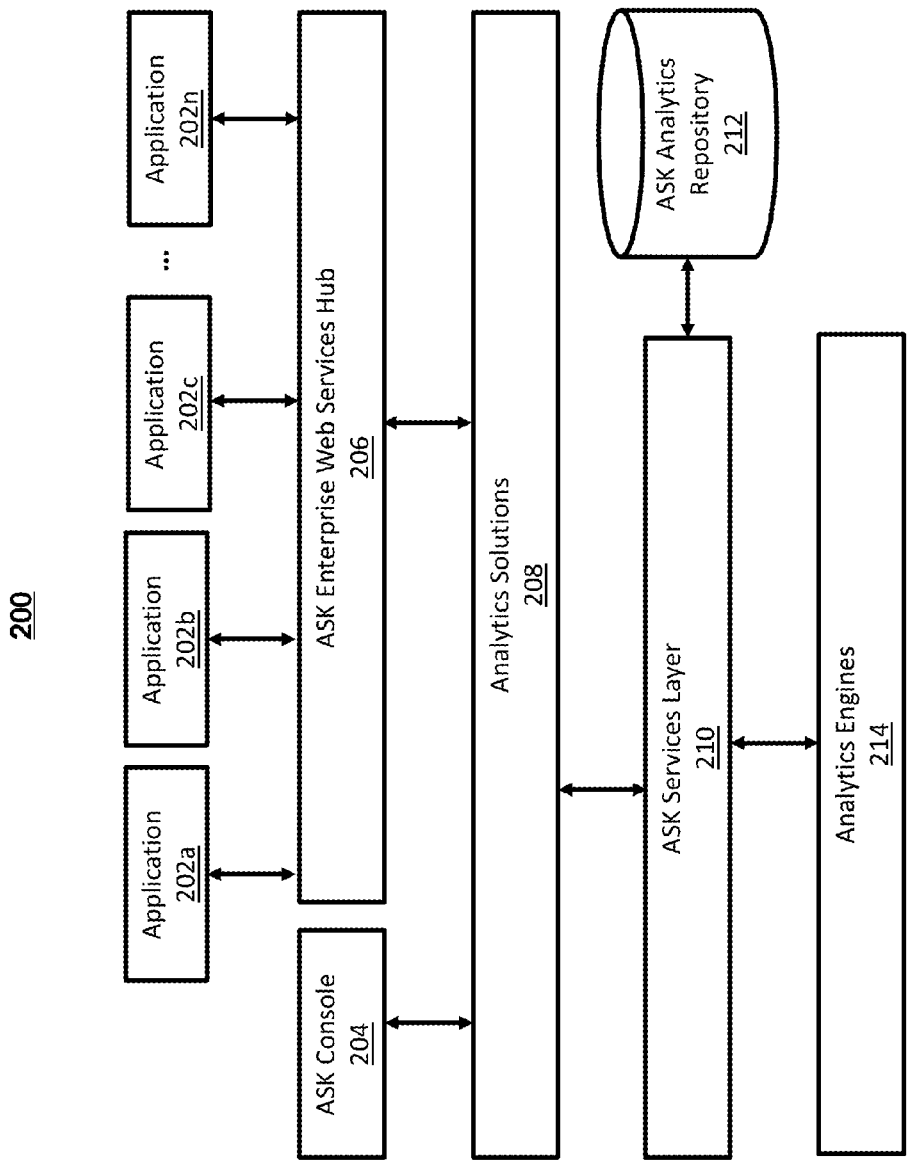
FIG. 2 depicts an example of an analytics solution kit environment in accordance with an embodiment.

FIG. 2 depicts an example of an ASK environment 200 in accordance with an embodiment. A plurality of applications 202a, 202b, and 202c-202n interface with ASK enterprise web services hub 206 to publish and subscribe to analytics. As an example, application 202a can be an intelligent water planning application, while applications 202b and 202c-202n can include applications for energy and utility management, analytics drive asset management, and planning analytics for asset lifecycle management. The ASK console 204 and the ASK enterprise web services hub 206 interface to analytics solutions 208, which may include transportation analytics, energy and utility analytics, building analytics, and cross industry analytics. The analytics solutions 208 interface with an ASK services layer 210 that further interfaces with ASK analytics repository 212 and analytics engines 214. The ASK services layer 210 may include deployment and validation services, execution and orchestration services, and monitoring services. The ASK services layer 210 may also include analytics engine adapters, such as ASK engine abstraction layer 118 of FIG. 1 for interfacing with the analytics engines 214. The analytics engines 214 may include the core analytic engines 120 and packaged analytic engines 122 of FIG. 1.

The ASK analytics repository 212 is a data store that may include analytics models and schemas, analytics monitoring data, analytics orchestration data, and analytics lifecycle management data. The ASK analytics repository 212 may be stored in a metadata repository, which can be a file system or relational database based on user preference and desired security and performance. For less complex installs, a user may elect to use a file-based repository. For more complex, enterprise-wide installs the user can use a database. In an embodiment, ASK supports IBM DB2, which is a trademark or registered trademark of International Business Machines Corporation, as a database management system. The metadata repository contains information about the solutions, models, sequences, analytic engines, and data schemas, such as those depicted in FIG. 1, that have been registered.

FIG. 3 depicts an ASK environment 300 for stakeholders to contribute to analytics solutions directly or indirectly in accordance with an embodiment. The ASK environment 300 includes the analytics solutions 208 of FIG. 2, ASK services layer 210 of FIG. 2 and analytics engines 214 of FIG. 2. ASK 302 includes the ASK services layer 210 and data models 304. The analytics engines 214 provide input to the ask services layer 210, which in turn provides input to the analytics solutions 208. Information sources 306 provide input to the data models 304, which in turn provide input to the analytics solutions 208. Analytics algorithm developers build deep analytics models using specific analytics workbenches of the analytics engines 214 without having to integrate analytics into an overall enterprise solution. Information technology administrators can map solutions to deployment models using infrastructure services for workload optimization 308. Data architects provide the data models 304 to enable development of analytics models. Analytics solution end users use the analytics solutions 208 to make predictive and prescriptive decisions. Enterprise developers develop enterprise application applications and integrate with analytics using ASK 302 without needing to understand specific underlying analytics interfaces.

Figure 4A:
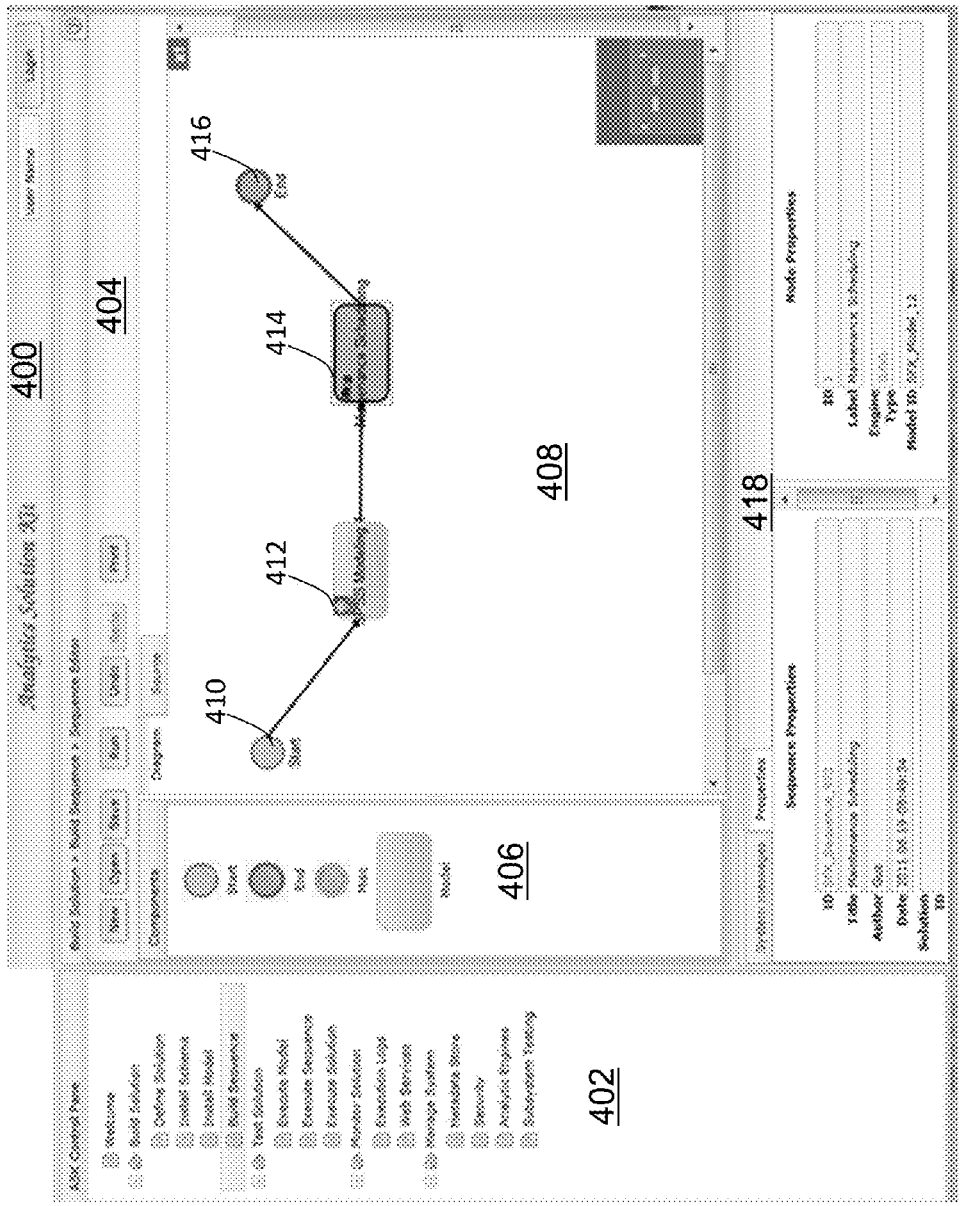
FIG. 4A depicts a view of a user interface of an analytics solution kit in accordance with an embodiment.

FIG. 4A depicts a view of a user interface of an analytics solution kit 400 in accordance with an embodiment. The user interface of FIG. 4A may be part of the ASK administrative console 102 of FIG. 1 or the ASK console 204 of FIG. 2. An ASK control pane 402 provides a number of options, such as displaying a welcome screen, building a solution, testing a solution, monitoring a solution, and performing system management. In the example of FIG. 4A, building a solution includes the ability to define a solution, install one or more schemas, install one or more models, and build a sequence. Testing a solution may include executing a model, executing a sequence, and executing a solution. Monitoring a solution can include accessing execution logs and web services. Performing system management can include configuring a metadata store, security, analytic engines, and subsystem testing.

View 404 is an example user interface of a sequence editor from the build solution, build sequence of the ASK control pane 402. A component selection pane 406 depicts examples of components that can be included in a sequence as part of a solution, such as a start node, and end node, a miscellaneous mode, and a model. In exemplary embodiments, every sequence begins with a start node, and ends with one or more end nodes. Between the start and end nodes, model or data transformation nodes can be included, which are wired together. Wires or links between nodes represent the data that flows from one node to the next to define input/output characteristics. A sequence can include a combination of model nodes that may be associated with difference analytic engines.

In the example of FIG. 4A, a sequence 408 is depicted that includes a start node 410 coupled to a model node 412, where the model node 412 is also coupled to a maintenance scheduling node 414 that is coupled to an end node 416. After the start node 410, execution of the sequence 408 begins with the model node 412 and output from the model node 412 flows into the maintenance scheduling node 414. The output of the sequence 408 can be returned in log files from the sequence execution. To execute the sequence 408, a user selects a run button.

When executing a solution or sequence, the user may be presented with the same sequence of steps as when running a single model. Data inputs can be provided in multiple files and are associated with the models linked to start nodes. The configuration parameters for all nodes in a sequence can be supplied in a single configuration file. A tabbed view 418 may support viewing and/or editing of sequence properties and node properties, as well as displaying system messages.

Figure 4B:
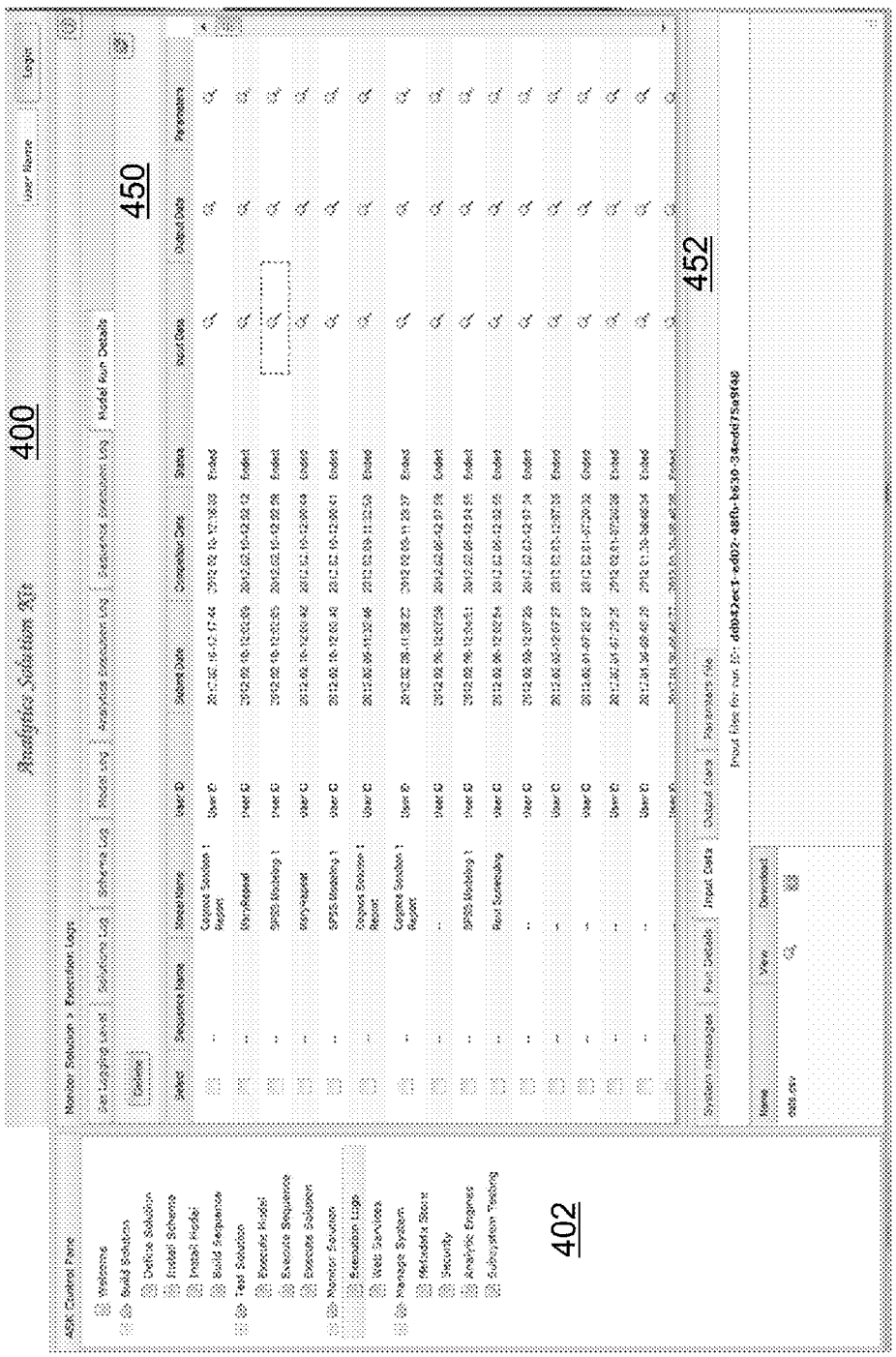
FIG. 4B depicts another view of a user interface of an analytics solution kit in accordance with an embodiment.

FIG. 4B depicts another view of a user interface of the analytics solution kit 400 in accordance with an embodiment. View 450 in FIG. 4B is an example of a user interface when monitor solution, execution logs is selected from the ASK control pane 402. A number of logs and various details can be inspected in the view 450 as part of the execution logs. For example, the view 450 can support setting a logging level and viewing of a solutions log, a scheme log, a model log, an analytics execution log, a sequence execution log, and model run details. Underlying analytics engines 214 of FIG. 2, such as the core analytic engines 120 and packaged analytic engines 122 of FIG. 1, can each have different log and test probe capabilities provided through different APIs with varying formats and access constraints. The logging interface of ASK 400 harmonizes the differences to present a coherent view across the various engines. In the example of FIG. 4B, a user can select and view a sequence name, model name, user ID, submit date, completion date, status, input data, output data, and parameters for models run using different engines at different times. A tabbed view 452 can support viewing and downloading of system messages, run details, input data, output data, and parameter files for selected log data from running a model.

Figure 4C:
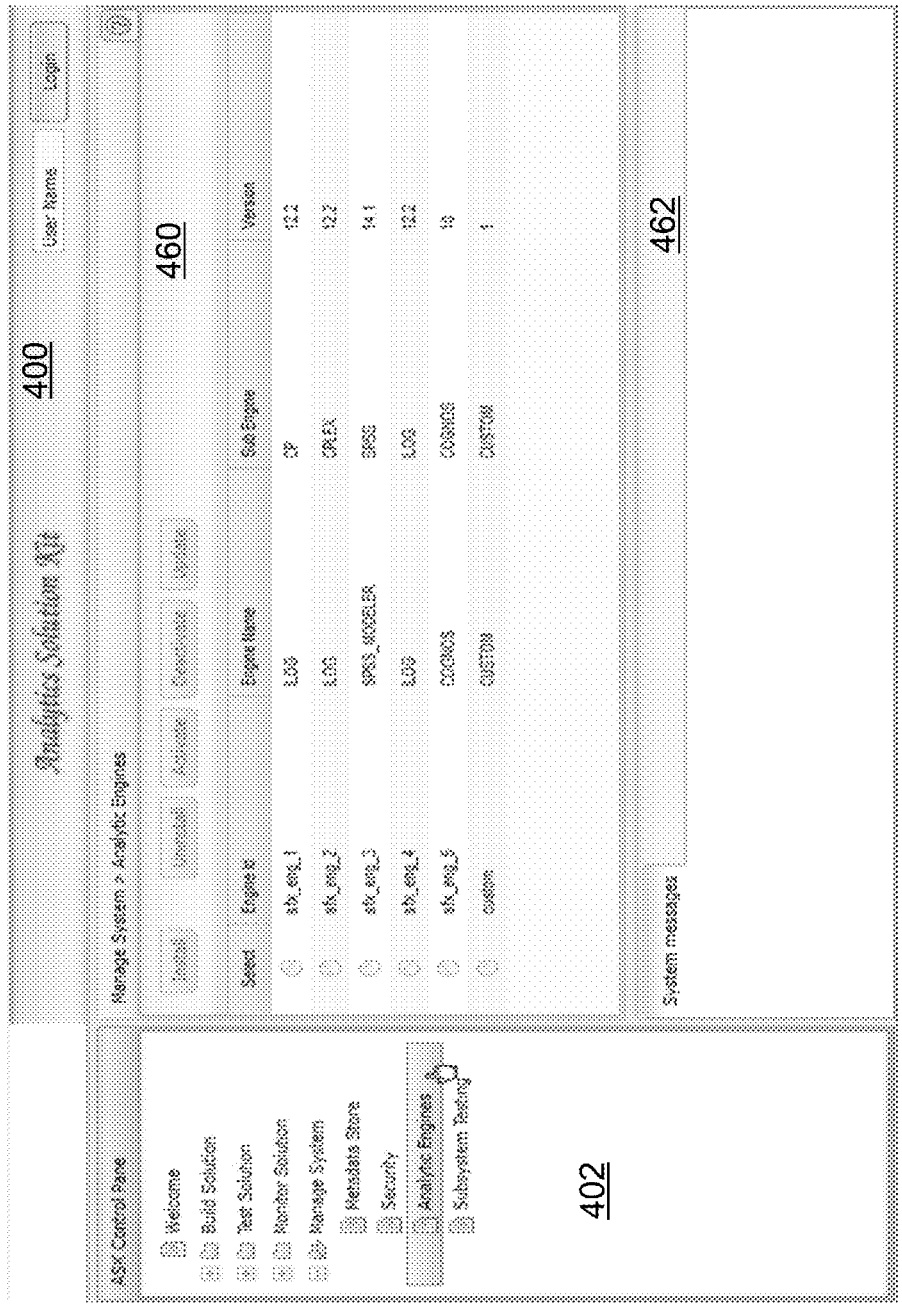
FIG. 4C depicts another view of a user interface of an analytics solution kit in accordance with an embodiment.

FIG. 4C depicts another view of a user interface of the analytics solution kit 400 in accordance with an embodiment. View 460 in FIG. 4C is an example of a user interface when manage system, analytic engines is selected from the ASK control pane 402. A number different analytics engines 214 of FIG. 2, such as the core analytic engines 120 and packaged analytic engines 122 of FIG. 1, can be installed and activated through the view 460. In the example of FIG. 4C, ASK-specific engine IDs can be created for each installed analytic engine. Each analytic engine can include an engine name, a sub engine name, and an associated version. The view 460 supports installing, uninstalling, activating, deactivating, and updating a number of analytic engines to support models in sequences of solutions in ASK. A tabbed view 462 can support viewing and downloading of system messages associated with configuring the analytic engines.

Figure 5:
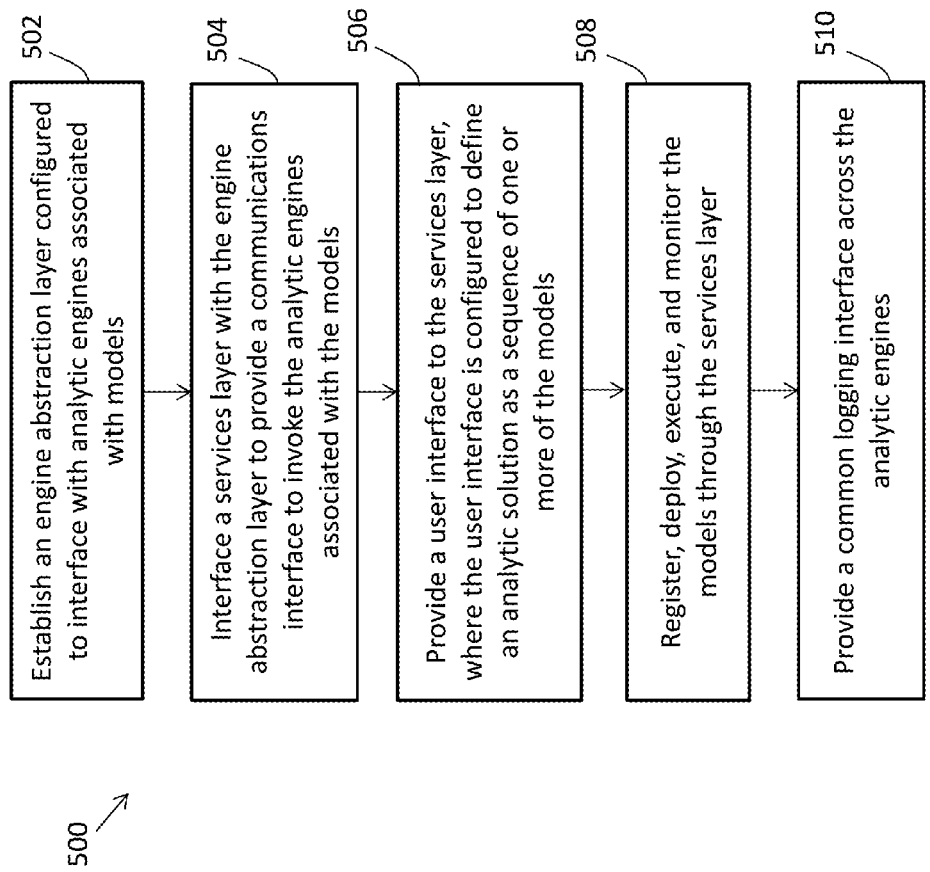
FIG. 5 depicts a process for analytic solution integration in accordance with an embodiment.

FIG. 5 depicts a process 500 for analytic solution integration in accordance with an embodiment. The process 500 is described in reference to FIGS. 1-5. At block 502, an engine abstraction layer 118 is established that is configured to interface with a plurality of analytic engines 120 and 122 associated with a plurality of models 110. The models 110 include representations of one or more of a descriptive, prescriptive, or predictive solution to a problem. At least one of the models 110 may be an analytic model. In the schemas 112, a schema associated with the analytic model can be defined as data that are available in the analytic model. Input data validation may be performed for the analytic model based on the schema.

At block 504, a services layer 106 interfaces with the engine abstraction layer 118 to provide a communication interface to invoke the analytic engines 120 and 122 associated with the models 110. The services layer 106 can provide representational state transfer web services that support direct invocation by an enterprise application 104 and an administrative console 102.

At block 506, a user interface (e.g., administrative console 102) to the services layer 106 is provided. The user interface is configured to define an analytic solution as an executable sequence of one or more of the models 110, such as sequence 408. Analytics solutions 208 can be provided that include a combination of transportation analytics, energy and utility analytics, building analytics, and cross industry analytics.

At block 508, registering, deploying, executing, and monitoring of the models 110 is supported through the services layer 106. Registered data associated with the process 500 can be stored in a metadata repository, such as the artifacts 108-114 of FIG. 1, the ASK analytics repository 212 of FIG.

2, and/or the information sources 306 of FIG. 3, that is accessible through one of: a file system and a database system.

At block 510, a common logging interface, such as that depicted in view 450, can be defined across the analytic engines 120 and 122. The common logging interface makes interfacing differences between the analytic engines 120 and 122 transparent to ASK users.

Figure 6:
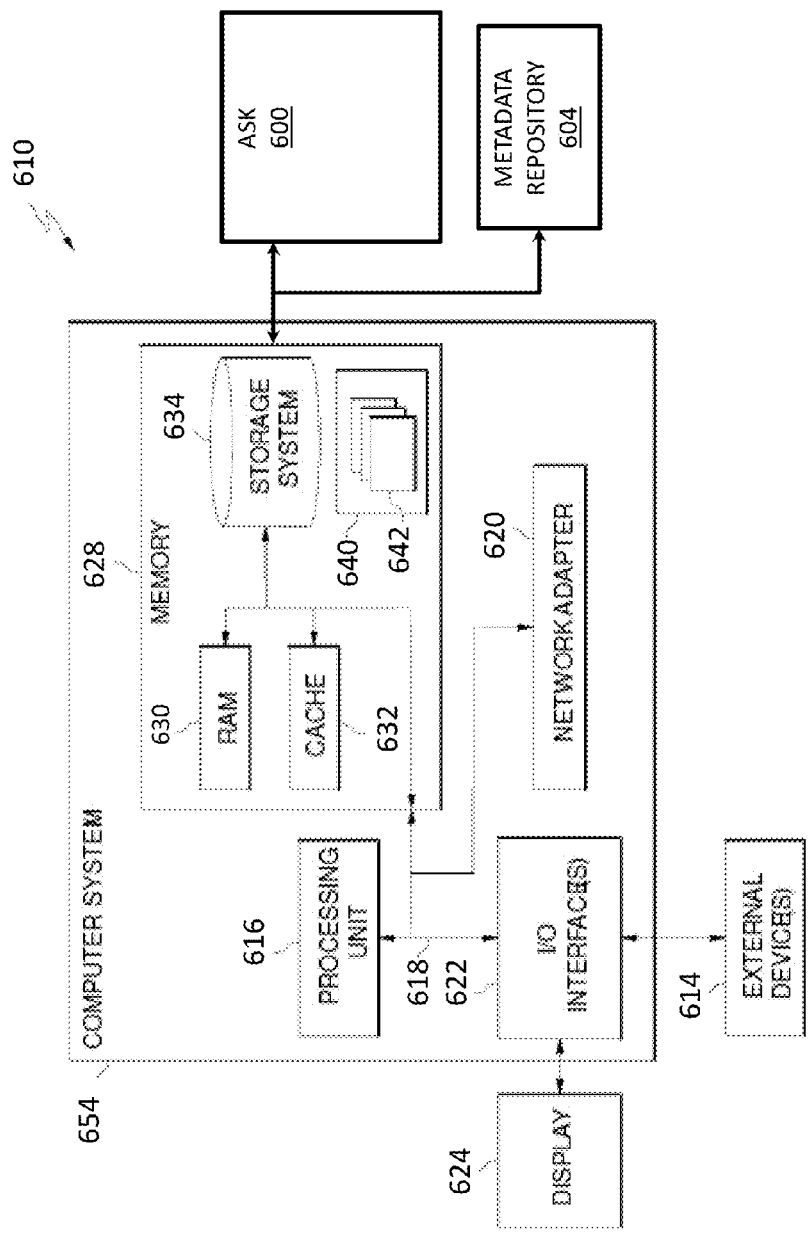
FIG. 6 depicts a computer system for implementing an analytics solution kit in accordance with an embodiment.

Referring now to FIG. 6, a schematic of an example of a computer system 654 in an environment 610 is shown. The computer system 654 is only one example of a suitable computer system and is not intended to suggest any limitation as to the scope of use or functionality of embodiments described herein. Regardless, computer system 654 is capable of being implemented and/or performing any of the functionality set forth hereinabove.

In the environment 610, the computer system 654 is operational with numerous other general purpose or special purpose computing systems or configurations. Examples of well-known computing systems, environments, and/or configurations that may be suitable as embodiments of the computer system 654 include, but are not limited to, personal computer systems, server computer systems, cellular telephones, thin clients, thick clients, hand-held or laptop devices, multiprocessor systems, microprocessor-based systems, set top boxes, programmable consumer electronics, network personal computer (PCs), minicomputer systems, mainframe computer systems, and distributed cloud computing environments that include any of the above systems or devices, and the like.

Computer system 654 may be described in the general context of computer system-executable instructions, such as program modules, being executed by one or more processors of the computer system 654. Generally, program modules may include routines, programs, objects, components, logic, data structures, and so on that perform particular tasks or implement particular abstract data types. Computer system 654 may be practiced in distributed computing environments, such as cloud computing environments, where tasks are performed by remote processing devices that are linked through a communications network. In a distributed computing environment, program modules may be located in both local and remote computer system storage media including memory storage devices.

As shown in FIG. 6, computer system 654 is shown in the form of a general-purpose computing device. The components of computer system 654 may include, but are not limited to, one or more computer processing circuits (e.g., processors) or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 654 typically includes a variety of computer system readable media. Such media may be any available media that is accessible by computer system 654, and it includes both volatile and non-volatile media, removable and non-removable media.

System memory 628 can include computer system readable media in the form of volatile memory, such as random access memory (RAM) 630 and/or cache memory 632. Computer system 654 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. An example application program or module is depicted in FIG. 6 as ASK 600. ASK 600 is an embodiment of ASK 302 of FIG. 3, and can be implemented on an application server, run locally or distributed between multiple computer systems in the environment 610. For example, ASK 600 and metadata repository 604 may reside in memory 628. The metadata repository 604 can include the artifacts 108-114 of FIG. 1, the ASK analytics repository 212 of FIG. 2, and/or the information sources 306 of FIG. 3. The metadata repository 604 can be stored in storage system 634 or in other portions of system memory 628. Alternatively, the metadata repository 604 may be stored elsewhere in the environment 610. The metadata repository 604 is used herein as one example of a location where the ASK-related data may be stored, it is not intended to imply that a database system is required as ASK-related data may be stored in any manner that allows types of accesses described herein.

Computer system 654 may also communicate with one or more external devices 614 such as a keyboard, a pointing device, a display device 624, etc.; one or more devices that enable a user to interact with computer system 654; and/or any devices (e.g., network card, modem, etc.) that enable computer system 654 to communicate with one or more other computing devices. Such communication can occur via input/output (I/O) interfaces 622. Still yet, computer system 654 can communicate with one or more networks such as a local area network (LAN), a general wide area network (WAN), and/or a public network (e.g., the Internet) via network adapter 620. As depicted, network adapter 620 communicates with the other components of computer system 654 via bus 618. It should be understood that although not shown, other hardware and/or software components could be used in conjunction with computer system 654. Examples, include, but are not limited to: microcode, device drivers, redundant processing units, external disk drive arrays, redundant array of independent disk (RAID) systems, tape drives, and data archival storage systems, etc.

Figure 7:
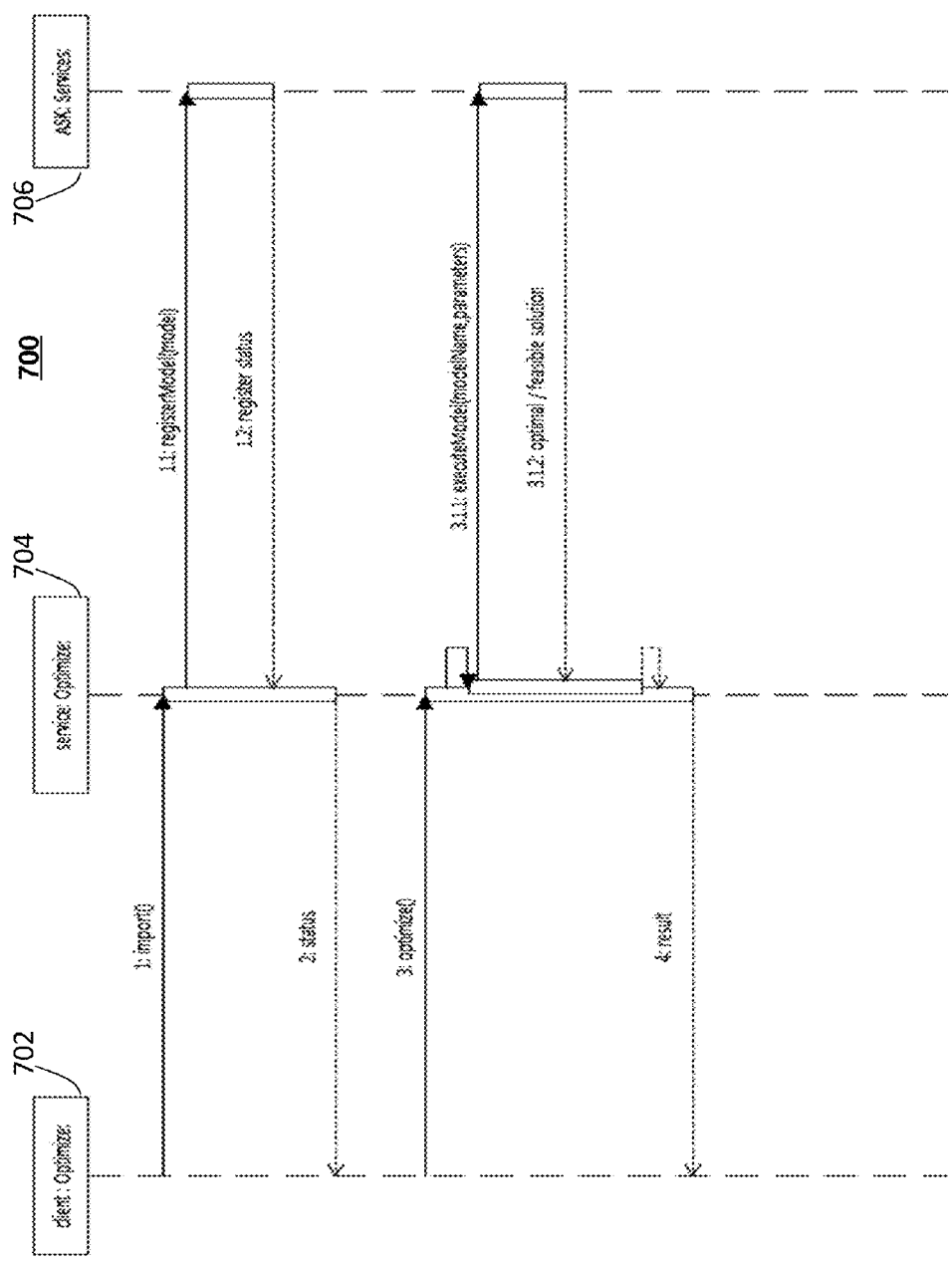
FIG. 7 depicts an example sequence for an optimization service in accordance with an embodiment.

FIG. 7 depicts an example sequence 700 for an optimization service in accordance with an embodiment. The sequence 700 is an ILOG example, where a client such as ASK console 102 or enterprise application 104 of FIG. 1 requests optimization that is performed by ILOG as the core analytic engine 120 of FIG. 1. An optimize client 702 imports a model via optimize service 704 at import( ) call 1, which results in registering the model with ASK services 706 at 1.1. ASK services 706 return register status at 1.2 to the optimize service 704, which in turn provides status at 2 to the optimize client 702. The optimize client 702 makes an optimize( ) call at 3 to the optimize service 704, which results in an executeModel( ) call at 3.1.1 to the ASK services 706. The ASK services 706 return an optimal/feasible solution at 3.1.2 to the optimize service 704. The optimize service 704 returns a result at 4 to the optimize client 702.

Figure 8:
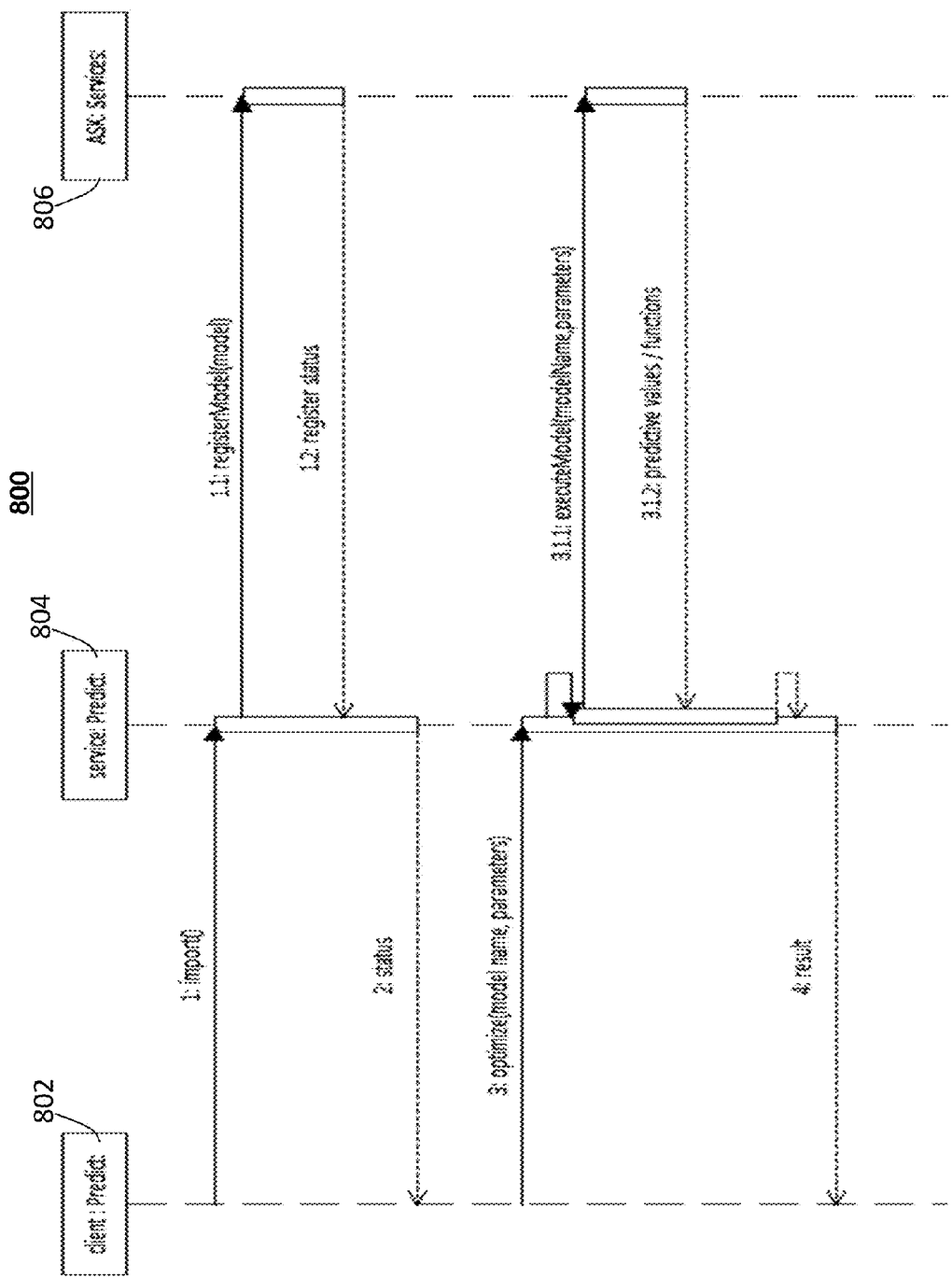
FIG. 8 depicts an example sequence for a prediction service in accordance with an embodiment.

FIG. 8 depicts an example sequence 800 for a prediction service in accordance with an embodiment to perform predictive optimization. The sequence 800 is an SPSS example, where a client such as ASK console 102 or enterprise application 104 of FIG. 1 requests prediction that is performed by SPSS as the core analytic engine 120 of FIG. 1. An predict client 802 imports a model via predict service 804 at import( ) call 1, which results in registering the model with ASK services 806 at 1.1. ASK services 806 return register status at 1.2 to the predict service 804, which in turn provides status at 2 to the predict client 802. The predict client 802 makes an optimize( ) call at 3 to the predict service 804, which results in an executeModel( ) call at 3.1.1 to the ASK services 806. The ASK services 806 return predictive values/functions at 3.1.2 to the predict service 804. The predict service 804 returns a result at 4 to the predict client 802.

Figure 9:
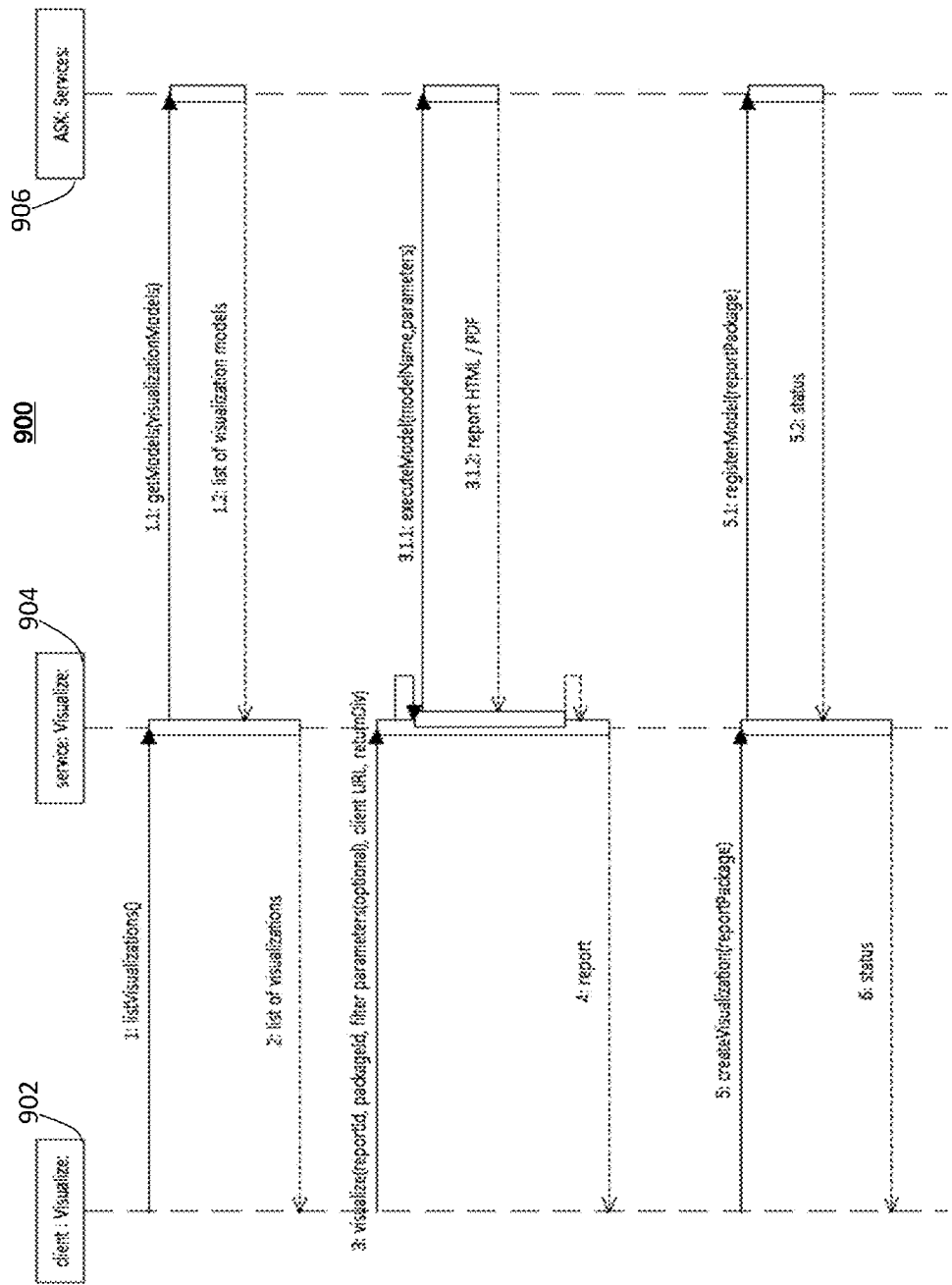
FIG. 9 depicts an example sequence for a visualization service in accordance with an embodiment.

FIG. 9 depicts an example sequence 900 for a visualization service in accordance with an embodiment. The sequence 900 is a Cognos example, where a client such as ASK console 102 or enterprise application 104 of FIG. 1 requests visualization that is performed by Cognos as the core analytic engine 120 of FIG. 1. A visualize client 902 requests a list of visualizations at 1 from a visualize service 904. The visualize service 904 calls getModels( ) at 1.1 of ASK services 906. The ASK services 906 return a list of visualization models at 1.2 to the visualize service 904, which returns a list of visualizations at 2 to the visualize client 902. The visualize client 902 makes a visualize( ) call at 3 to the visualize service 904. The visualize service 904 in turn makes an executeModel( ) call at 3.1.1 to the ASK services 906. The ASK services 906 respond with a report at 3.1.2 to the visualize service 904. The visualize service 904 provides a report at 4 to the visualize client 902. The visualize client 902 requests to create a visualization at 5 to the visualize service 904. The visualize service 904 requests to register a model at 5.1 with the ASK services 906. The ASK services 906 respond with status at 5.2 to the visualize service 904. The visualize service 904 returns the status at 6 to the visualize client 902.

It is understood in advance that although this disclosure includes a detailed description on a particular computing environment, implementation of the teachings recited herein are not limited to the depicted computing environment. Rather, embodiments are capable of being implemented in conjunction with any other type of computing environment now known or later developed (e.g., any client-server model, cloud-computing model, etc.).

Technical effects and benefits include providing analytics solutions integration, where multiple analytics engines are accessible through a common interface. ASK enables formation of more complex solutions and sequences that integrate multiple models as part of one solution sequence, where the models may be associated with otherwise unrelated analytics engines. Monitoring, testing, and logging functions further integrate analytic engines, and a services layer enables access through a console or other enterprise application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for analytic solution integration, the method comprising:
    establishing an engine abstraction layer configured to interface with a plurality of analytic engines associated with a plurality of models;
    interfacing a services layer with the engine abstraction layer to provide a communication interface to invoke the analytic engines associated with the models;
    providing a user interface to the services layer, the user interface configured to define an analytic solution as an executable sequence of two or more of the models associated with different instances of the analytic engines, wherein the services layer provides representational state transfer web services that support direct invocation by an enterprise application and an administrative console that provides the user interface including a graphic sequence editor to build the executable sequence;
    registering, deploying, executing, and monitoring the models through the services layer; and
    storing registered data in a metadata repository that is accessible through one of: a file system and a database system.

2. The computer-implemented method of claim 1, wherein at least one of the models is an analytic model, and further comprising:
    defining a schema associated with the analytic model as data that are available in the analytic model; and
    performing input data validation for the analytic model based on the schema.

3. The computer-implemented method of claim 1, wherein the models include representations of one or more of a descriptive, prescriptive, or predictive solution to a problem.

4. The computer-implemented method of claim 1, further comprising:
    providing analytics solutions that include a combination of transportation analytics, energy and utility analytics, building analytics, and cross industry analytics.

5. The computer-implemented method of claim 1, further comprising:
    providing a common logging interface across the plurality of analytic engines and a configurable logging level that identifies event types to be logged from the analytic engines.

* * * * *